United States Patent
Inoue

(10) Patent No.: US 9,323,463 B2
(45) Date of Patent: Apr. 26, 2016

(54) STORAGE SYSTEM AND CACHE CONTROL METHOD

(71) Applicant: Hitachi, Ltd., Tokyo (JP)

(72) Inventor: Tsuyoshi Inoue, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/425,898

(22) PCT Filed: Aug. 5, 2014

(86) PCT No.: PCT/JP2014/070541
§ 371 (c)(1),
(2) Date: Mar. 4, 2015

(65) Prior Publication Data
US 2016/0041776 A1 Feb. 11, 2016

(51) Int. Cl.
*G06F 12/00* (2006.01)
*G06F 3/06* (2006.01)
*G06F 12/08* (2016.01)

(52) U.S. Cl.
CPC ............ *G06F 3/0619* (2013.01); *G06F 3/0665* (2013.01); *G06F 3/0689* (2013.01); *G06F 12/0811* (2013.01); *G06F 2212/283* (2013.01)

(58) Field of Classification Search
CPC . G06F 12/0866; G06F 11/1666; G06F 11/20; G06F 11/2069; G06F 11/2089; G06F 11/2097; G06F 12/0813; G06F 12/0815; G06F 12/0888; G06F 17/30424; G06F 2212/283; G06F 2212/284; G06F 3/0605
See application file for complete search history.

(56) References Cited

U.S. PATENT DOCUMENTS

| | | |
|---|---|---|
| 7,673,100 B1 | 3/2010 | Niver et al. |
| 2005/0166086 A1 | 7/2005 | Watanabe |
| 2006/0026229 A1 | 2/2006 | Ari et al. |
| 2009/0276594 A1 | 11/2009 | Fujii et al. |
| 2011/0029730 A1 | 2/2011 | Durocher et al. |
| 2013/0198230 A1 | 8/2013 | Ochi et al. |

FOREIGN PATENT DOCUMENTS

| | | |
|---|---|---|
| JP | 2007-537548 A1 | 12/2007 |
| JP | 2008-123363 A | 5/2008 |
| JP | 2009-271666 A | 11/2009 |
| JP | 2013-156765 A | 8/2013 |
| WO | 2004/027625 A1 | 4/2004 |

*Primary Examiner* — Yong Choe
(74) *Attorney, Agent, or Firm* — Volpe and Koenig, P.C.

(57) ABSTRACT

A first storage apparatus, on the basis of management information representing data existing in a virtual cache area, when a first data conforming to a read request exists in the virtual cache area, determines whether the first data is stored in a first cache area of the first storage apparatus. The first storage apparatus, when the first data is not stored in the first cache area, acquires the first data from a second cache area of a second storage apparatus, and transmits the first data to a host computer. The first storage apparatus, when the first data is associated with the first cache area on the basis of a degree of importance, notifies the second storage apparatus to that effect, and change an apparatus in charge of a cache of the first data of the management information from the second storage apparatus to the first storage apparatus. The first storage apparatus, when the first data is associated with the second cache area, notifies the second storage apparatus to that effect, and deletes the first data.

11 Claims, 21 Drawing Sheets fig .4

307

| 401 | 403 | 405 | 407 | 409 | 411 | 413 | 415 |
|---|---|---|---|---|---|---|---|
| Original Node name | Virtual VOL ID | Virtual LBA | Block length | Tier information | Current Node name | Entry start number | The number of entries used |
| VST01 | VVOL1 | 00000000h | 200000h | T1 | VST03 | P0001 | 2000h |
| VST01 | VVOL1 | 00200000h | 1000h | T1 | VST03 | P0002 | 10h |
| VST01 | VVOL1 | 00200000h | 10000h | T2 | VST01 | P0003 | 100h |
| .. | .. | .. | .. | .. | .. | .. | .. |

| 417 | 419 | 421 | 423 | 425 | 427 | 429 | 431 |
|---|---|---|---|---|---|---|---|
| Access frequency | Last access date and time | Attribute flag | TBL update right | New allocation time | Cache Residensy | CacheSlot number | Sequential Flag |
| 15 | 2012/03/12 10:30:20 | Valid | Share | 2012/03/12 10:20:30 | ON | Address A | OFF |
| 5 | 2012/03/12 10:30:21 | Invalid | Share | 2012/03/12 10:21:31 | OFF | Address A | OFF |
| 10 | 2012/03/12 10:30:22 | Valid | VST01 | 2012/03/12 10:21:32 | OFF | Address B | ON |
| .. | .. | .. | .. | .. | .. | .. | .. |

Global cache management table fig. 5

| Node ID | Cache capacity | Usage amount | Receiving amount | Free capacity | Deposit amount | Free capacity threshold |
|---|---|---|---|---|---|---|
| Self (Own node) | 20GB | 8.7GB | 2.5GB (Total value) | 11.3GB | 0.5GB (Total value) | Target value: 10.0GB Limit value: 5.0GB |
| HM800-02 (Other node) | 20GB | 3.3GB | 0.1GB | 16.7GB | 0.2GB | 8.0GB |
| HM800-03 (Other node) | 20GB | 6.6GB | 1.1GB | 13.4GB | 0.1GB | 8.0GB |
| : | : | : | : | : | : | : |

Cache capacity management table

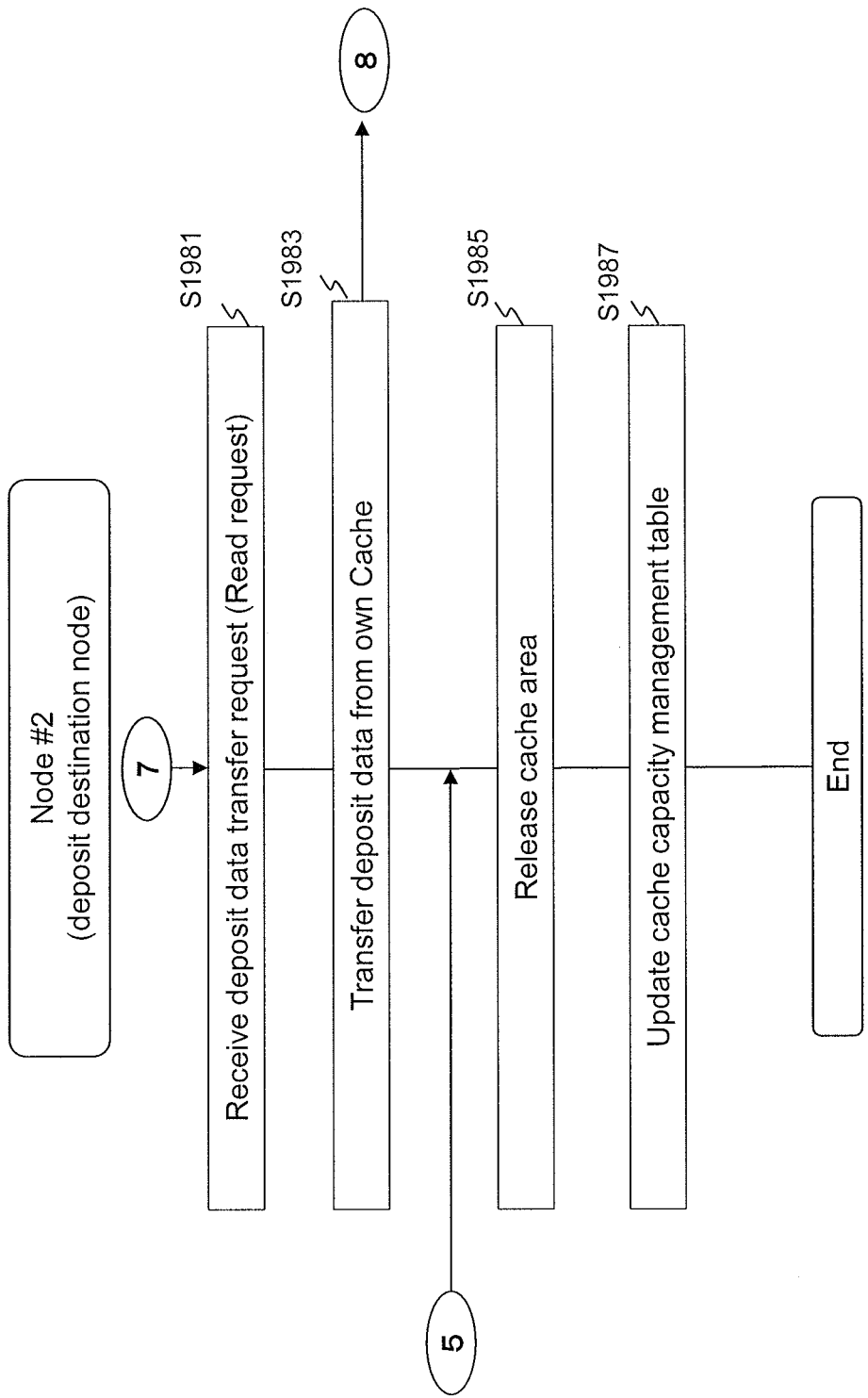

STORAGE SYSTEM AND CACHE CONTROL METHOD

TECHNICAL FIELD

The present invention relates to a storage system having a plurality of storage apparatuses.

BACKGROUND ART

A distributed processing system is known in which, when a master node receives a data access request from any one of a plurality of nodes (computers), the master node inquires of each node whether data is stored in a page cache, and responds, to a request source node requesting an access, with information specifying a node responding that data is to be stored in a page cache. (PTL 1)

CITATION LIST

Patent Literature

[PTL 1]
Japanese Patent Application Publication No. 2013-156765

SUMMARY OF INVENTION

Technical Problem

In the technology described above, no information is available as to which data is stored in a cache memory of which node, and a master node has to inquire of all nodes whether data exists in a cache memory every time an access request is made.

In a storage apparatus, consumption of a back-end band width of the storage apparatus is reduced by storing data with frequent accesses in a cache memory in which data read from a storage device is temporarily stored, and reading with a storage apparatus the data on the cache memory in response to a read access from a host computer.

However, in a case of a storage system having a plurality of storage apparatuses, as exhibited by occurrences of variation in usage between respective cache memories of storage apparatuses, cache memories are not necessarily utilized at high efficiency in a whole storage system.

Solution to Problem

To solve the problem, a storage system of one embodiment of the present invention includes: a first storage apparatus; and a second storage apparatus coupled to the first storage apparatus. Each of the first and the second storage apparatuses includes: a microprocessor coupled to the host computer; a memory coupled to the microprocessor; and a storage device coupled to the microprocessor. The microprocessor provides the host computer with a volume on the basis of the storage device. The memory includes: a shared area; and a cache area. The microprocessor of the first storage apparatus allocates part of a cache area of the first storage apparatus to a virtual cache area. The microprocessor of the second storage apparatus allocates part of a cache area of the second storage apparatus to a virtual cache area. The shared area stores management information that represents data existing in the virtual cache area and a free area size of each of cash areas of the first and the second storage apparatuses. The management information represents association among data, an apparatus in charge of a cache that is a storage apparatus having a cache area storing data, an apparatus in charge of a volume that is a storage apparatus having a volume into which data is stored, and a degree of importance representing responsiveness to an I/O request from the host computer to the data. The microprocessor of the first storage apparatus, when receiving a read request that specifies first data, determines whether the first data exists in the virtual cache area on the basis of the management information, when the first data exists in the virtual cache area, determines whether the first data is stored in a first cache area of the first storage apparatus, when the first data is not stored in the first cache area of the first storage apparatus, acquires the first data from a second cache area of the second storage apparatus, stores the first data in the first cache area, and transmits the first data to the host computer on the basis of the management information. The microprocessor of the first storage apparatus determines whether to associate the first data to the first cache area or to the second cache area on the basis of the degree of importance, when the first cache area is determined to be associated with, notifies the second storage apparatus to that effect, and in the management information, changes the apparatus in charge of a cache of the first data from the second storage apparatus to the first storage apparatus. The microprocessor of the first storage apparatus, when the second cache area is determined to be associated with, notifies the second storage apparatus to that effect, and deletes the first data stored in the first cache area.

Advantageous Effects of Invention

According to one mode of the present invention, in a storage system having a plurality of storage apparatus, cache memories of an entire system can be efficiently used.

BRIEF DESCRIPTION OF DRAWINGS

FIG. 4 is one example of a global cache management table 307.
FIG. 5 is one example of a cache capacity management table 309.

FIG. 22 is a fourth part of the flowchart of the cache capacity determination processing of other nodes.

DESCRIPTION OF EMBODIMENTS

In a description hereinafter, information is described with an expression of "a a a table" and such. The information may be expressed by something other than a data structure such as a table. To emphasize the information is not dependent on a data structure, "a a a table" and such may be referred to as "a a a information".

When content of each piece of information is described, expressions of "information" and "identifier" are used. They are mutually replaceable.

In the following description, there is a case where explanation is made using "program" as a subject word. Since a program performs predetermined processing while using a memory and a communication interface to be executed by a microprocessor, explanation of processing in use of a program as a subject word may be regarded as explanation in use of a microprocessor as a subject word. Also, the description may be replaced by a description of processing performed by an apparatus including the microprocessor. Part of or all of the processing performed by the program may also be achieved by dedicated hardware. The program may also be installed in a computer by a program distribution server or a computer readable storage medium.

In each figure, same reference numbers are assigned to elements, which are identical to one another. When these identical elements need to be distinguished, numbers such as #1 and #2 are assigned individually in place of reference numbers. However, explanation may be made by omitting the numbers as needed.

Examples of the present invention will be described below by using drawings and such. Examples below illustrate concrete examples of content of the present invention and the present invention is not limited to the examples. Hence, various changes and modifications may be made by a person skilled in the art within a scope of the technical idea disclosed in the present description.

Example 1

A configuration of a computer system of the present embodiment is described in detail below.

Figure 1:
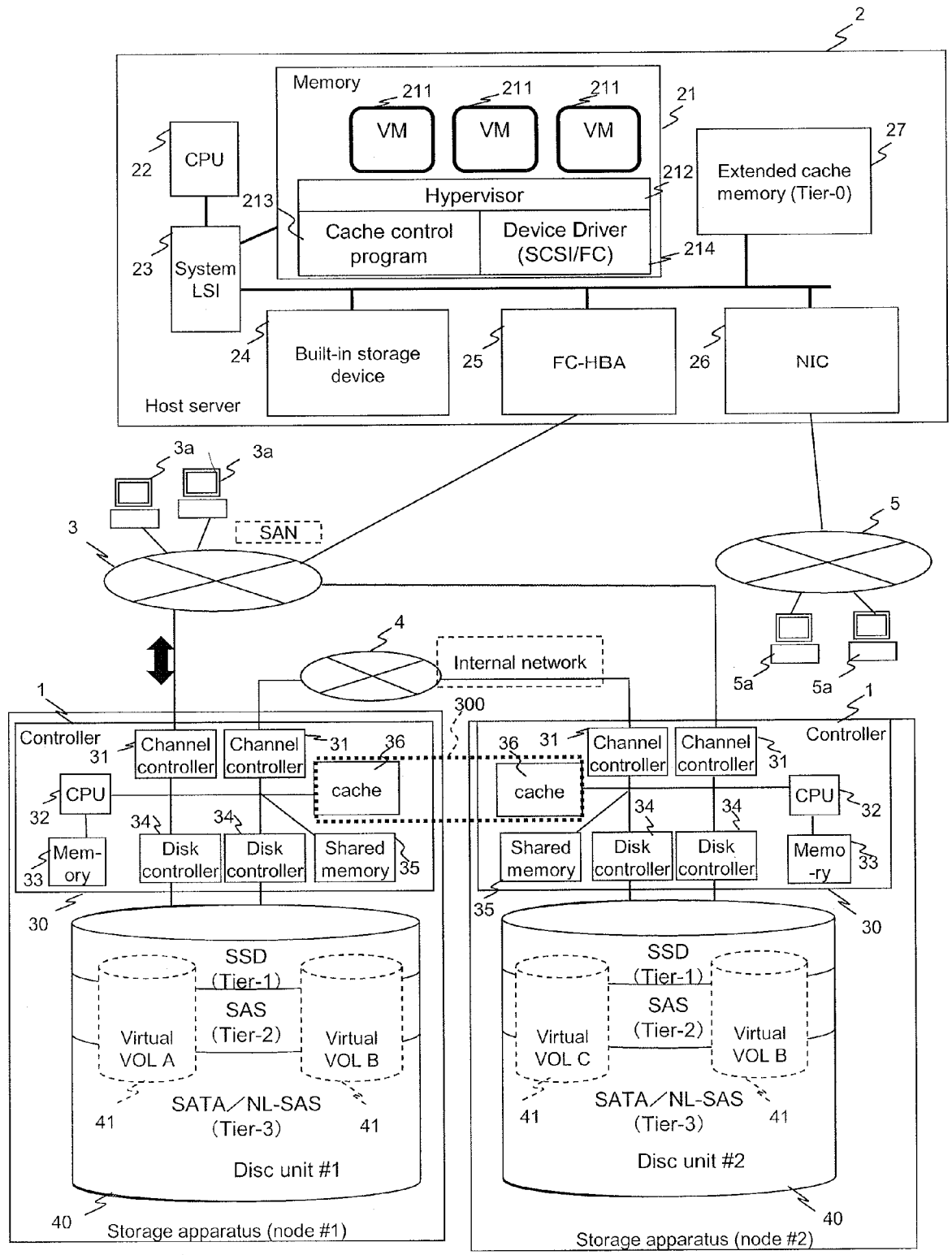
FIG. 1 is a configuration diagram of a computer system of Example 1.
Figure 2:
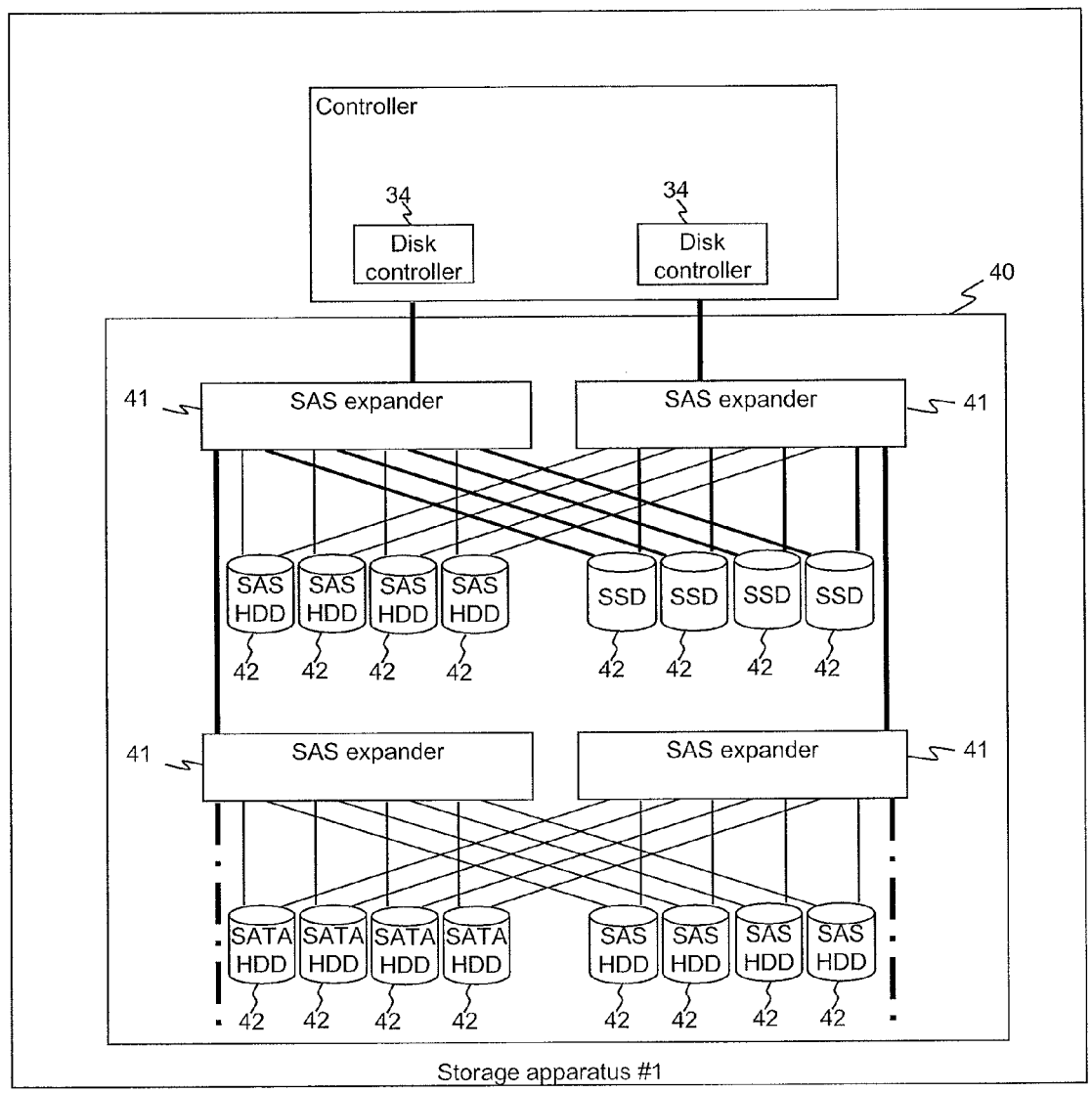
FIG. 2 is a configuration diagram of a storage apparatus.

FIG. 1 is a configuration diagram of a computer system of the present embodiment. FIG. 2 is a configuration diagram of a storage apparatus.

A computer system of the present embodiment includes: a host server (hereinafter referred to a host) 2; and a storage system. The storage system includes a plurality of storage apparatuses 1 (node #1, 2). The plurality of storage apparatuses 1 and the host 2 are coupled to each other by a communication network 3 such as a SAN (Storage Area Network), for instance. The communication network 3 is further coupled to a client 3a. Moreover, the plurality of storage apparatuses 1 are coupled to each other by a communication network 4 such as a LAN (Local Area Network), for instance. The host 2 is coupled to a client 5a through a communication network 5 such as a LAN, WAN (Wide Area Network), and DCE (Data Circuit-terminating Equipment), for instance. Although one host 2 is coupled to the communication networks 3, 5 in FIG. 1, a plurality of hosts 2 may be coupled thereto.

The host 2 includes: a memory 21; a processor (CPU: Central Processing Unit) 22; a system LSI (Large Scale Integration) 23; a built-in storage device 24; an FC (Fibre Channel)-HBA (Host Bus Adapter) 25; a NIC (Network Interface Card) 26; and an extended cache memory 27.

The memory 21 stores a program and data for each processing of the host 2. The built-in storage device 24 is an HDD or an SSD, for instance. The CPU 22 performs each processing of the host 2 according to the program and the data in the memory 21. The NIC 240 communicates with the client 5a through the communication network 5. The NIC 240 also communicates with the storage apparatuses 1 through the communication network 4. The system LSI 23 couples the CPU 22 and each part and controls communications therebetween. The FC-HBA 260 communicates with the storage apparatuses 1 through the communication network 4. The extended cache memory is a semiconductor device for extending a cache area in the memory 21.

The memory 21 further stores a VM 211 and programs. The programs are a hypervisor 212 for managing the VM 211, a cache control program 213 for controlling the memory 21 and the extended cache memory 27, and a device driver 214 for controlling the VM 211.

A configuration of the storage apparatuses 1 is described below. The plurality of storage apparatuses are fundamentally of the same configuration. Therefore, a description is made for one storage apparatus 1 unless needed. When two storage apparatuses 1 are to be distinguished for description below, they are referred to as node #1, #2.

The storage apparatus 1 includes: a controller 30; and a disk unit 40. The controller 30 is coupled to the disk unit 40 and the host 2.

The controller 30 includes: a plurality of channel control units 31; a processor (CPU) 32; a memory 33; a plurality of disk control units 34; a shared memory 35; and a cache memory 36. Each part of the controller 10 is coupled to one another by buses. Although in the illustrated example, there is one CPU 32, there may be a plurality of CPUs 32. In a description and drawings below, the cache memory 36 may be referred to as the cache 36.

The CPU 32 manages a global cache memory 300 based on the caches 36 included in the plurality of storage apparatuses 1. The global cache memory 300 provides all of the caches 36 of the plurality of storage apparatuses (nodes #1, 2) in the storage system as one virtual cache memory. In a description and drawings below, the global cache memory 300 may be referred to as the global cache 300.

The channel control unit 31 communicates with the host 2 or the other storage apparatus 1. The disk control units 34 are coupled to the disk unit 40 and communicate with the disk unit 40. The CPU 12 controls the storage apparatus 1 according to programs stored in the memory 33, the shared memory 35, and the cache 36. The cache 36 temporarily stores commands and data that pass the channel control unit 31.

The disk unit 40 includes plural kinds of drives 42. The plural kinds of drives are physical storage devices, and are, for instance, as illustrated in FIG. 2, an SAS (Serial Attached Small Computer System Interface)-HDD (Hard Disk Drive), an SATA (Serial Advanced Technology Attachment)-HDD, and an SSD (Solid State Drive), but are not limited to these. For instance, it may include an NL (Near Line)-SAS (Serial Attached SCSI) (refer to FIG. 1). As illustrated in FIG. 2, these drives 42 are coupled to one SAS expander 41, for each kind of drive 42. A RAID (Redundant Arrays of Inexpensive Disks) group may be configured by a plurality of drives, for each kind of these drives. By the CPU 32, the disk unit 40 is hierarchized for each kind, in other words, for each performance (automatic hierarchization, virtualization of storage Tiers). Specifically, the Tiers are, consecutively in order of higher performance, a Tier-1 that is a Tier based on an SSD, a Tier-2 that is a Tier based on an SAS-HDD, and Tier-3 that is a Tier based on an SATA-HDD. Although, in the illustrated example, each storage apparatus 1 has one disk unit 40, it may have a plurality of disk units 40.

The CPU 32 generates a pool for each Tier on the basis of the plural kinds of drives 42, and provides the host 2 with a virtual volume (virtual VOL) 41 on the basis of the pool. A storage area of any one of the Tiers is allocated to a storage area of the virtual VOL 41. As illustrated in the figure, although a virtual VOL #B is a virtual VOL on the basis of the disk unit #1, it may be transparently provided to the host 2 through the disk unit #2. Also a logical volume in the disk unit 40 may be provided to the host 2 without going through the virtual VOL 41.

Figure 3:
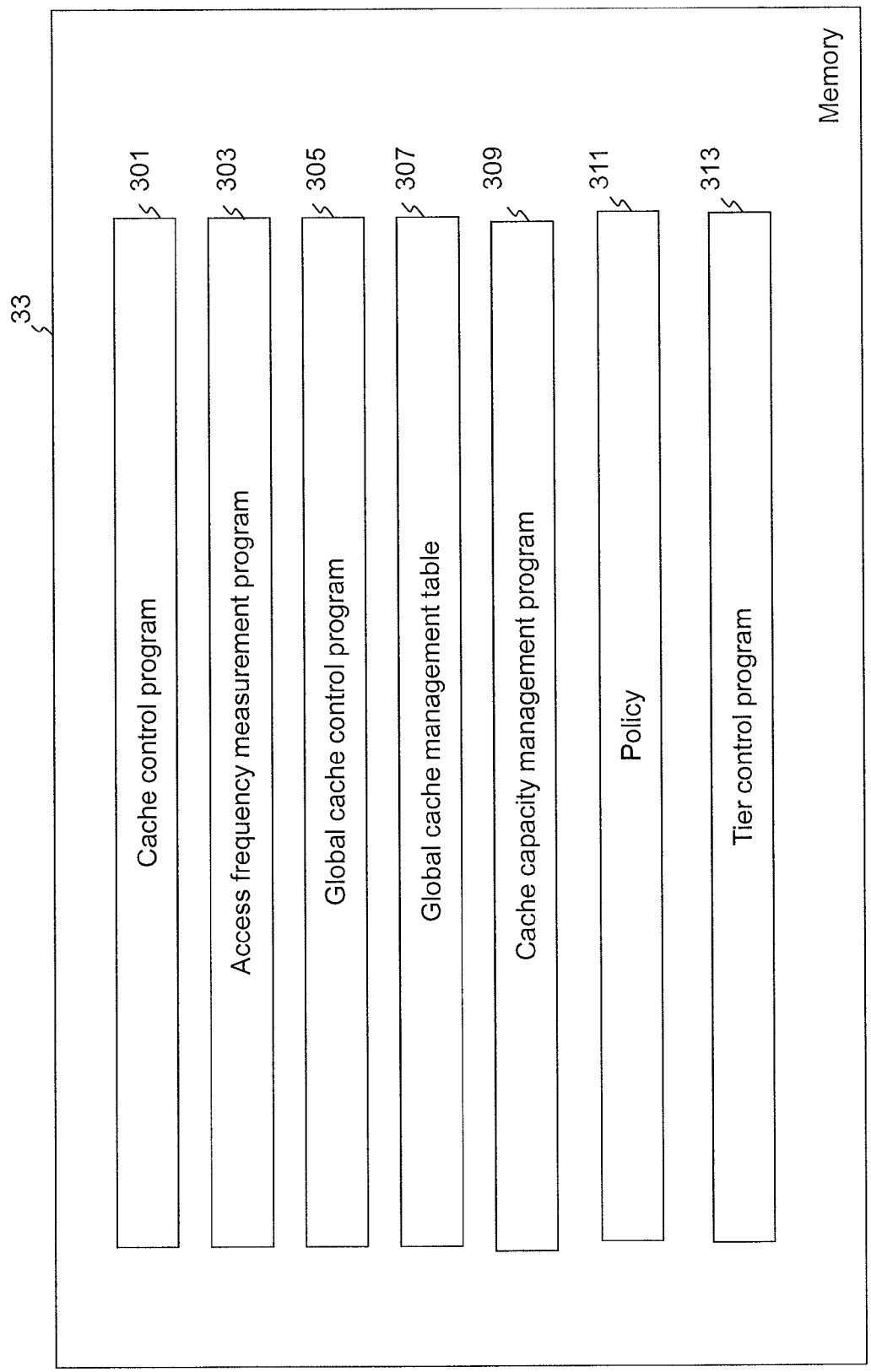
FIG. 3 is a configuration diagram of a memory 33.

FIG. 3 is a configuration diagram of the memory 33.

Each memory 33 of the plurality of storage apparatuses 1 includes: a cache control program 301; an access frequency measurement program 303; a global cache control program 305; a global cache management table 307; and a cache capacity management table 309.

The cache control program 301 is a program for controlling own cache 36. The access frequency measurement program 303 is a program for measuring an access frequency of data included in this program, in other words, data stored in own cache and a disk unit 20. The global cache control program 305 is a program for controlling the global cache 300. The global cache management table 307 is a table for managing information of each data stored in the global cache 300. The cache capacity management table 309 is a table for managing a capacity of each cache constituting the global cache 300. A policy 311 is a policy for selecting a cache to be allocated to the global cache 300. The details will be described later. A Tier control program 313 is a program for automatically controlling a Tier of data stored in own disk unit 40.

Each of the programs 301 to 305, each of the table 307, 309, and the policy 311 may be stored in the shared memory 35. The memory 33, the shared memory 35, and the cache 36 may be an area in one memory.

FIG. 4 is one example of the global cache management table 307.

The global cache management table 307 has an entry for each data stored in the global cache 300.

An entry of certain data has: an original node name 401 that is an identifier of the storage apparatus 1 having a virtual VOL storing the data; a virtual VOL ID 403 that is an identifier of a virtual VOL storing the data; a virtual LBA (Logical Block Address) 405 representing an address of the data in the virtual VOL; a block length 407 representing a length of the data; Tier information 409 representing a Tier corresponding to the data; a current node name 411 that is an identifier of a storage apparatus having a cache 36 storing the data; an entry start number 413 used for confirming an entry number of the table and searching at a time of referencing to the table; a used entry number 415 representing data number of one entry; an access frequency 417 of the data; the last access date and time 419 to the data; an attribute flag 421 that is a flag representing whether the data is valid; a table (TBL) update right 423 representing a right holder to update the entry; a new allocation time 425 representing time at which a cache area is allocated to the data; a Cache Residency 427 that is a flag representing whether the data is to reside in the cache 36 of the current node; a Cache Slot number 429 representing an address of the cache 36 in which the data is stored; and a Sequential flag 431 that is a flag representing whether the data is part of data (sequential data) to be sequentially accessed, which is used for determining at a time of destaging the data from a cache (for instance, LRU: Least Recently Used and such) by the last access date and time 419 and new allocation time 425

FIG. 5 is one example of the cache capacity management table 309.

The cache capacity management table 309 has an entry for each cache 36 constituting the global cache 300.

An entry of a certain cache has: a node ID 501 that is an identifier of a storage apparatus (node) having the cache; a cache capacity 503 that is a capacity of the cache; the usage amount 505 of the cache; a receiving amount 507 representing a size of data stored in virtual VOL of the other node out of the usage amount 505 of the cache; a free capacity 509 representing a size of an unused area (free area) out of the cache capacity 503 of the cache; a deposit amount 511 that is a size of data stored in a cache of the other node out of data stored in a virtual VOL of own node; and a free capacity threshold 513 configured by a user. For the free capacity threshold 513, a target value and a limit value of the free capacity 509 of the cache may be configured. The details will be described later.

An operation of the computer system is described below.

Figure 6:
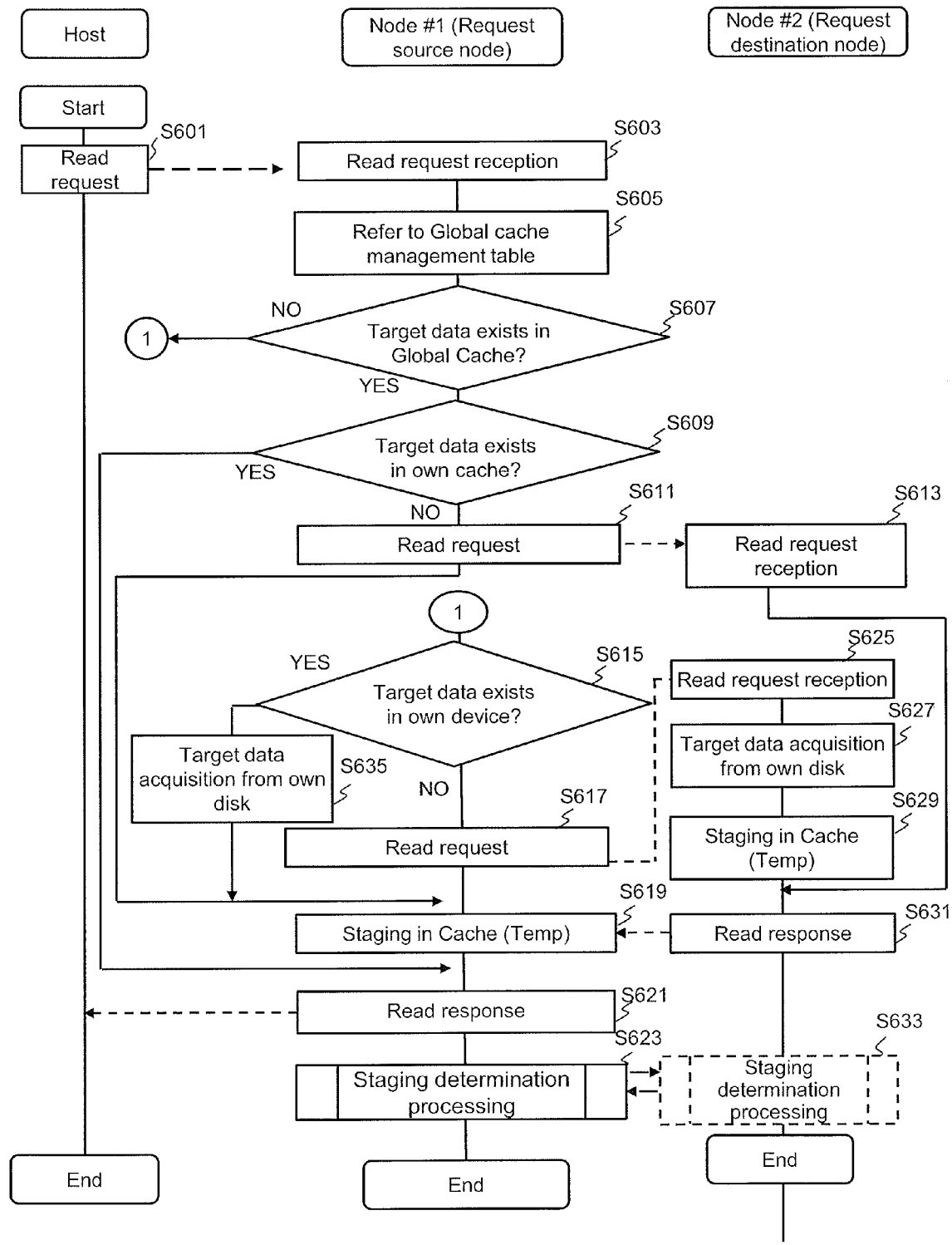
FIG. 6 is a flowchart of read processing.

FIG. 6 is a flowchart of read processing.

In the present embodiment, the host 2 transmits a read request to one node on the basis of a preconfigured rule. In a description below, a node that is a node that receives a read request specifying a target data from the host 2 and provides a virtual VOL is referred to as a request source node (for instance, a node #1). Here, "To provide a virtual VOL" includes a case where a virtual VOL on the basis of the disk unit 40 of the other storage apparatus 1 is transparently provided to the host 2 as well as a case where a virtual VOL on the basis of own disk unit 40 is provided to the host 2. Moreover, in the description below, each step is simply abbreviated as "S".

Read processing is performed by a CPU 32 of a request source node executing the global cache control program 305 when receiving a read request from the host 2. When the request source node transfers a read request to a request destination node, a CPU 32 of the request destination node executes the global cache control program 305 when receiving the read request.

In S601, the host 2 transmits to a request source node a read request specifying a virtual VOL and a virtual LBA of a storing destination of a target data, and block lengths thereof.

In S603, the request source node receives the read request. The request source node refers to the global cache management table 307 (S605), and determines whether the target data is stored in the global cache 300 (S607).

As a result of the determination, when the target data is not stored in the global cache 300 (S607: No), processing of the request source node advances to the processing in S615 (to 1 in the figure). On the other hand, as a result of the determination, when the target data is stored in the global cache 300 (S607: Yes), the request source node determines whether the target data is stored in own cache 36 (S609).

As a result of the determination, when the target data is stored in own cache 36 (S609: Yes), the request source node acquires the target data from own cache 36, transmits a read response to the host 2 (S621), and performs storing determination processing (S623) to end the processing. The storing determination processing will be described later.

On the other hand, as a result of the determination, when the target data is not stored in own cache 36 (S609: No), the request source node transfers a read request of the target data to the request destination node (S611), and stands by until a response thereof is received in S619. Each node may hold information representing nodes of storing destinations of all data in the storage system, and the request source node may determine a request destination node on the basis of the information. The request source node may transfer read requests to all nodes in the storage system. In this case, a node storing the target data out of nodes that receive the read request becomes a request destination node.

The request destination node receives the read request (S613). The request destination node acquires the target data from own cache 36 and transmits a read response to the request source node (S631).

In S619, the request source node receives the read response, temporarily stores the target data in own cache 36 (S619), and transmits the read response to the host 2 (S621). The request destination node performs storing determination processing (S623), and ends this processing.

In S615, the request source node determines whether the target data is stored in the virtual VOL of own node. As a result of determination, when the target data is not in the virtual VOL of own node (S615: No), the request source node transmits the read request to the request destination node (S617), and stands by until a response thereof is received in S619.

After that, the request destination node receives the read request (S625). The request destination node acquires the target data from the virtual VOL of own node (S627), temporarily stores the target data in own cache 36 (S629), and then transmits the read response to the request source node (S631). The request destination node performs the storing determination processing according to a notification from the request source node and such (S633). The storing determination processing will be described later.

As a result of determination in S615, when the target data is in the virtual VOL of own node (S615: Yes), the request source node acquires the target data from the virtual VOL of own node (S635), and processing of the request source node advances to the processing in S619.

By the processing above, since a global cache memory on the basis of caches of a plurality of storage apparatuses is provided in a storage system having a plurality of storage apparatuses, cache memories of the entire system can be efficiently used. Specifically, the request source node that receives the read request from the host 2 refers to the global cache management table 307, and when the target data is registered to the global cache 300, identifies a node having a cache 36 in which the target data is stored, acquires the target data from the cache, and can respond to the host.

When the target data is not registered to the global cache memory, the target data can be registered to the global cache memory when a read request for the target data is received.

Although, in the present embodiment, the host 2 transmits a read request to one node on the basis of a preconfigured rule, a node to which the host 2 transmits a read request may be a node in which data is stored in the disk unit 40, for instance.

Figure 7:
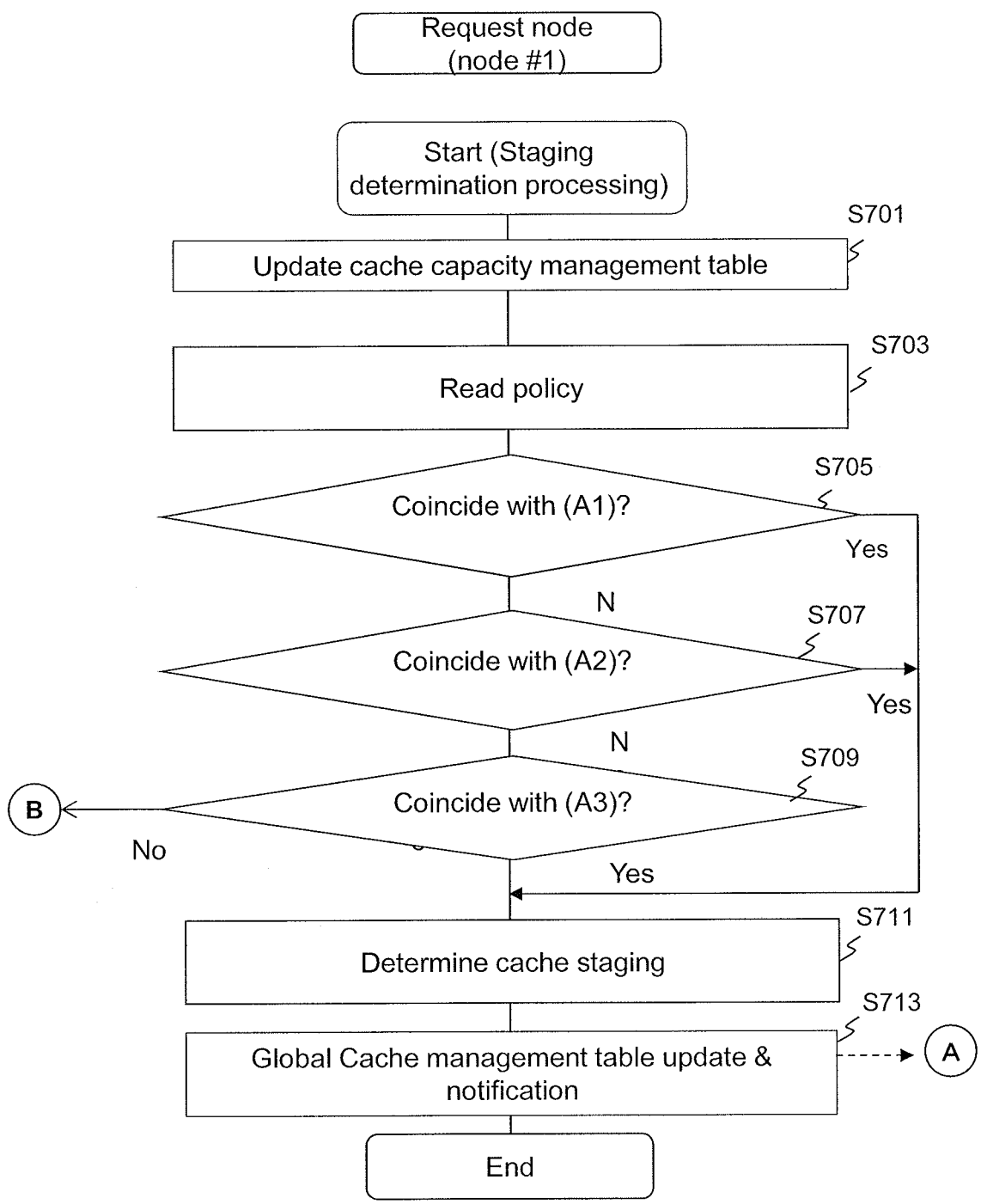
FIG. 7 is a first part of a flowchart of storing determination processing.
Figure 8:
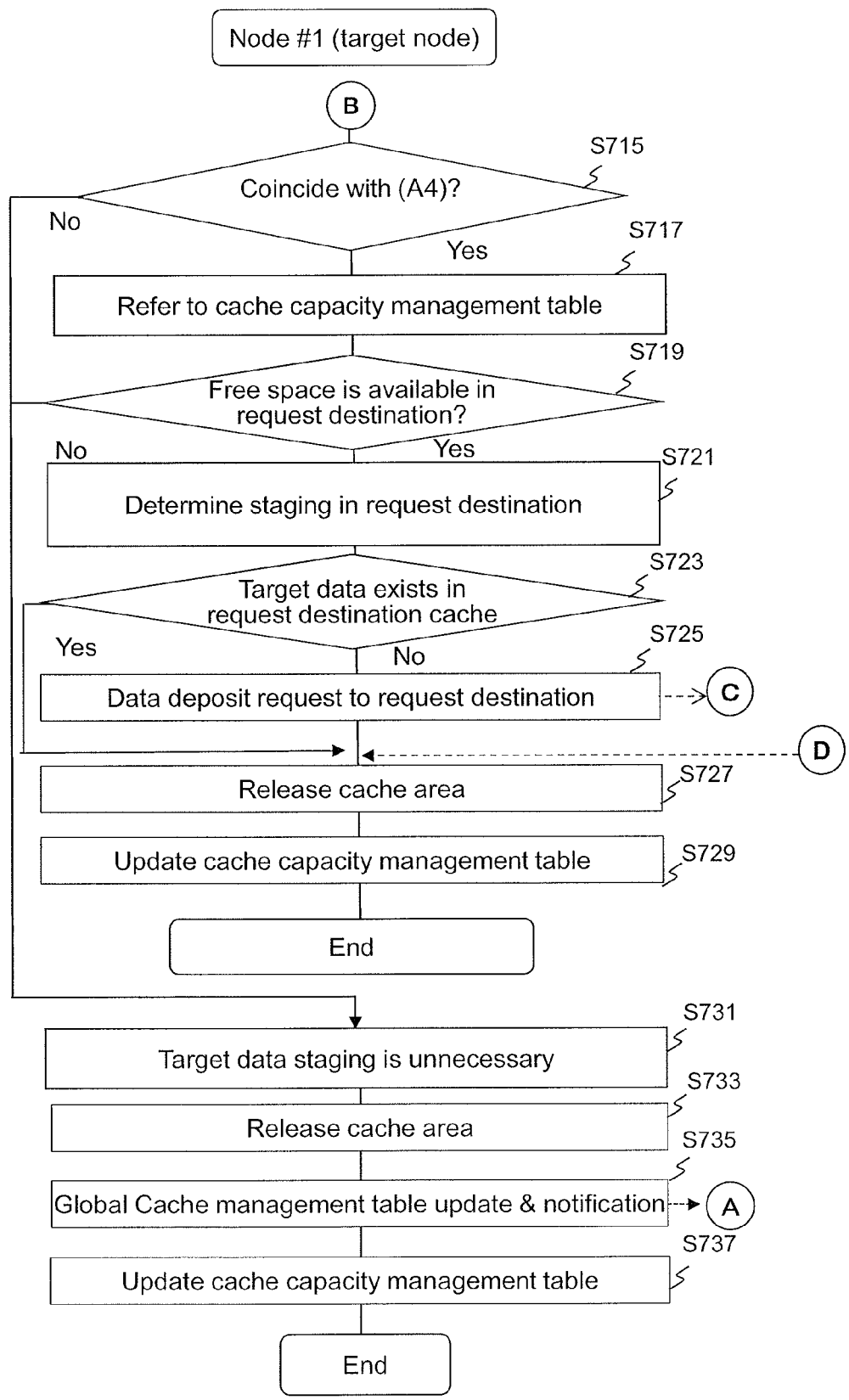
FIG. 8 is a second part of the flowchart of the storing determination processing.

FIG. 7 is a first part of a flowchart of the storing determination processing performed by the request source node. FIG. 8 is a second part of the flowchart of the storing determination processing performed by the request source node.

The storing determination processing is processing performed by the request source node in S623 of the read processing, and is performed also by the request destination node according to a notification from the request source node (S633 of the read processing).

In S701, the request source node updates the cache capacity management table 309. Specifically, the request source node changes the usage amount 505 and the free capacity 509 of own cache 36 to those at a state where the target data is stored, for instance.

In S703, the request source node reads the policy 311 stored in the memory 33. In the present embodiment, the policy represents a condition of a degree of importance of data and an operation when the condition is satisfied. The degree of importance represents responsiveness (respond speed) to an I/O request from the host computer to the data. When a certain node receives an I/O request to the data, responsiveness in a case where the data is stored in the cache of own node becomes high compared to responsiveness in a case where the data is stored in the cache of the other node. For instance, the degree of importance of the data includes any one of a data access frequency, the last access date and time, Cache Residency, and a Tier of the data. For instance, the policy is a required performance policy (A1), a data characteristic policy (A2), a data capacity policy (A3), or a Tier interlocking policy (A4). However, the policy is not limited to these and may be any kind of policy. Data of high degree of importance is preferably stored in the cache 36 of the storage apparatus (own node) in which the data is stored in own virtual VOL. This is because I/O performance becomes higher by storing the data in the cache 36 of own node rather than by storing the data in the cache of the other node.

In S705, the request source node determines whether the target data coincides with the required performance policy (A1). Here, the required performance policy (A1) is a policy that "when the target data is a Cache Residency, it is stored in own cache memory 36". Specifically, the request source node refers to the global cache management table 307, and determines whether a Cache Residency 427 of the target data is "ON". When the Cache Residency 427 is "ON" (S705: Yes), since this means that the target data is a Cache Residency, processing of the request source node advances to processing in S711. On the other hand, when the Cache Residency 427 is "OFF" (S705: No), since the target data is not a Cache Residency, processing of the request source node advances to processing in S707.

In S707, the request source node determines whether the target data coincides with the data characteristic policy (A2). Here, the data characteristic policy (A2) is a policy that "when the target data is a sequential data, it is stored in own cache 36". Specifically, the request source node refers to the global cache management table 307, and determines whether a Sequential flag 431 of the target data is "ON". When the Sequential flag 431 is "ON" (S707: Yes), since this means that the target data is a sequential data, processing of the request source node advances to processing in S711. On the other hand, when the Sequential flag 431 is "OFF" (S707: No), since the target data is not a sequential data, processing of the request source node advances to processing in S709.

In S709, the request source node determines whether own cache 36 coincides with the data capacity policy (A3). Here, the data capacity policy (A3) is a policy that "when a free capacity of a cache after storing the target data is equal to or larger than the free capacity threshold, the target data is stored in own cache 36". Specifically, the request source node refers to the cache capacity management table 309, and determines whether the free capacity 509 is equal to or larger than the free capacity threshold 513. For the free capacity threshold 513, either of two values of, for instance, a target value that is a threshold for providing the free area with a margin and a limit value to which the data is stored to a limit of an area of the cache 36 may be configured. When the free capacity 509 is equal to or larger than the free capacity threshold 513 (S709: Yes), since this means that target data can be stored in own cache 36, processing of the request source node advances to processing in S711. On the other hand, when the free capacity 509 is less than the free capacity threshold 513 (S709: Yes), since this means that the target data cannot be stored in own cache 36, processing of the request source node advances to processing in S715 (to B in FIG. 8).

In S711, the request source node determines storing of the target data temporarily stored in own cache 36. In S713, the request source node updates the global cache management table 307, and notifies the request destination node of the updated content to end processing (to A in FIG. 10). In this case, the updated content is storing of the target data in own cache 36, which, specifically, is a current node name 411, an access frequency 417, the last access date and time 419, a cache slot number 429, and such.

The processing continues to B in FIG. 8. In S715, the request source node determines whether the target data coincides with the Tier interlocking policy (A4). Here, the Tier interlocking policy (A4) is a policy that "when the target data belongs to an upper Tier (for instance, a Tier #1), the target data is stored in own cache 36". Specifically, the request source node refers to the global cache management table 307, and determines whether Tier information 409 of the target data is "T1". When the Tier information 409 is "T1" (S715: Yes), since this means that the target data belongs to the Tier #1, processing of the request source node advances to processing in S717. On the other hand, when the Tier information 409 is not "T1" (S715: No), since this means that the target data belongs to a Tier other than Tier #1, the request source node determines storing the target data in own cache is not needed (S731), and releases an area of the target data from own cache (S733).

Figure 10:
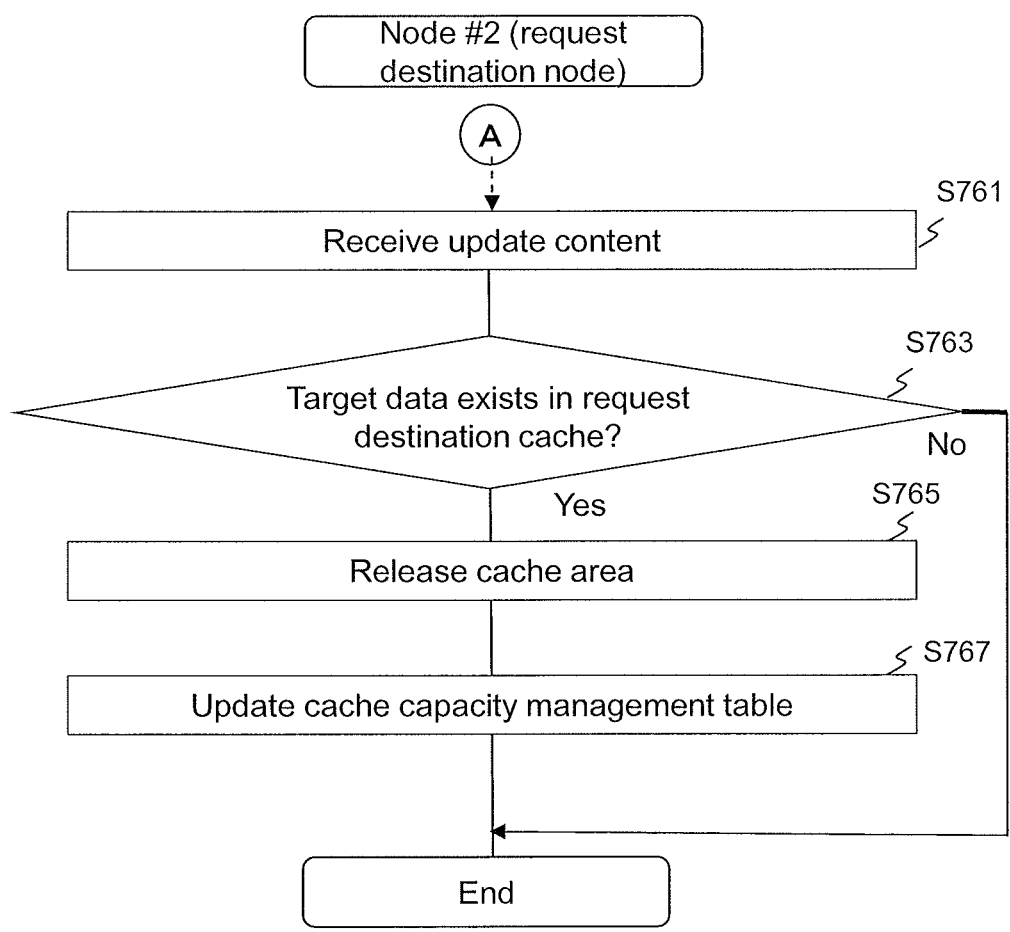
FIG. 10 is a fourth part of the flowchart of the storing determination processing.

In S735, the request source node updates the global cache management table 307, and notifies the request destination node of the updated content to end processing (to A in FIG. 10). In this case, the updated content is discard of the target data from the global cache 300, specifically, deletion of an entry of the target data.

In S737, the request source node updates the cache capacity management table 309, and ends processing. Specifically, for instance, the request source node updates the usage amount 505 and the free capacity 509 of the cache capacity management table 309 to values obtained after releasing the area of the target data from own cache 36.

In S717, the request source node refers to the cache capacity management table 309, and determines whether there is an unused area of a size sufficient for storing the target data in the cache 36 of the request destination node. Specifically, the request source node, concerning the cache capacity management table 309, determines whether a value of the free capacity 509 of the request destination node is equal to or larger than an amount of the target data.

As a result of determination, when a value of the free capacity 509 of the request destination node is less than an amount of the target data (S719: No), processing of the request source node advances to processing in S731. On the other hand, as a result of the determination, when a value of the free capacity 509 of the request destination node is equal to or larger than the amount of the target data (S719: Yes), the request source node determines to store (to stage) the target data in the cache 36 of the request destination node (S721).

In S723, the request source node refers to the global cache management table 307, and determines whether the target data exists in the cache 36 of the request destination node.

As a result of determination, when the target data does not exist in the cache 36 of the request destination node (S723: No), in S725 the request source node transmits a deposit request of the target data and the target data to the request destination node (to C in FIG. 9). The deposit request is an instruction of storing the target data in the cache 36 of the request destination node. On the other hand, as a result of the determination, when the target data exists in the cache 36 of the request destination node (S723: Yes), processing of the request source node advances to processing in S727. There may be a case where S727 is performed on account of a notification from D in FIG. 9 described later (S755). In this case, here, the request source node receives an updated content of the global cache management table 307, and updates own global cache management table 307 in accordance with the notification.

The request source node releases an area of the target data from own cache 36 (S727), updates the cache capacity management table 309 (S729), and ends processing. Specifically, for instance, the request source node updates the usage amount 505 and the free capacity 509 of the cache capacity management table 309 to values obtained after releasing the area of the target data from the cache 36. The request source node, when a deposit request is performed to the request destination node in S725, updates also the deposit amount 511 of the cache capacity management table 309.

By the processing described above, upon a read request, a determination can be made as to whether the target data stored in the cache 36 of the request source node is to be stored in the cache of the request source node according to a degree of importance.

When data is not stored in the request source node, a read request is transmitted to the other node (the request destination node) in which the target data is stored, is temporarily stored in the cache of the request source node, and can be transmitted to the host. In this case also, a determination can be made as to whether the target data is to be maintained in own cache according to a degree of importance. Thus, data to be stored in the global cache 300 can be prevented from being redundantly stored in cashes of 2 or more nodes.

Even for data that is determined not to be stored in the cache 36 of the request source node, deposition of the data can be requested to a cache of another node included in the global cache.

Figure 9:
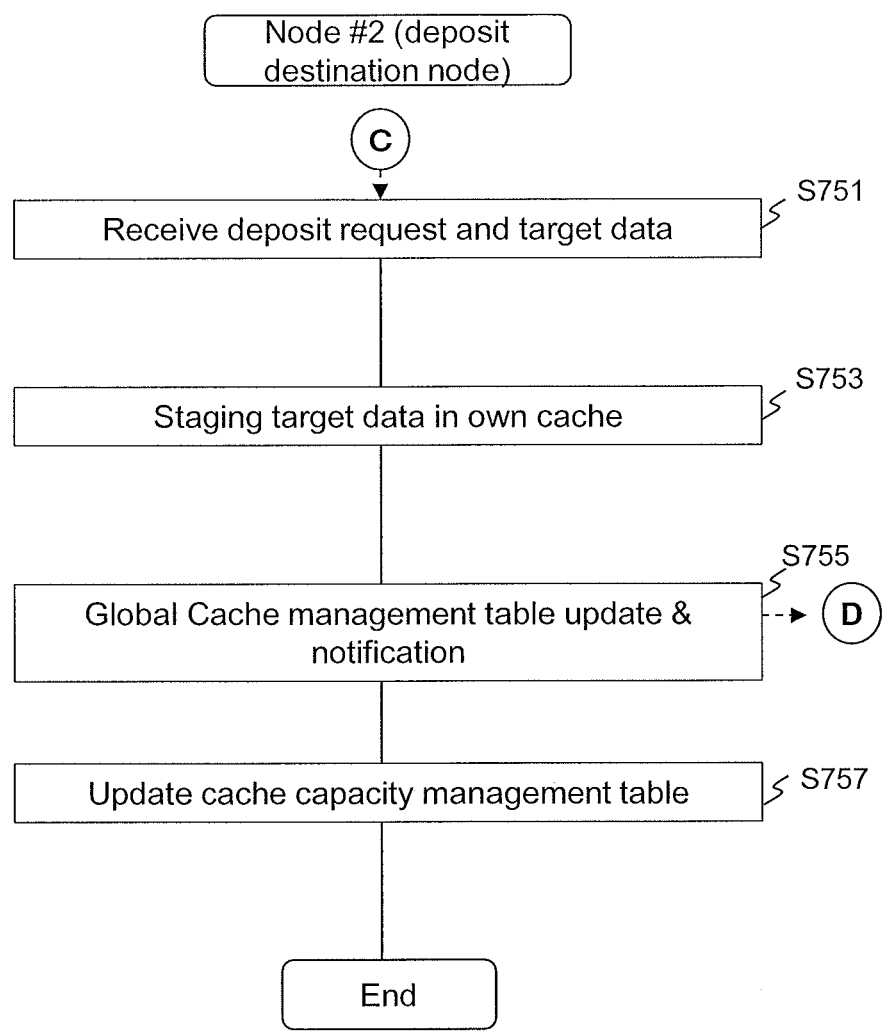
FIG. 9 is a third part of the flowchart of the storing determination processing.

FIG. 9 is a flowchart of storing determination processing in the request destination accompanying a deposit request.

The storing determination processing is processing performed by the request destination node upon receiving a deposit request of the target data of S725 that is storing determination processing performed by the request source node (from C in FIG. 8).

In S751, the request destination node receives a deposit request of the target data and the target data from the request source node.

In S753, the request destination node stores the target data in own cache 36 on the basis of the deposit request.

In S755, the request destination node updates own global cache management table 307, and notifies the request source node of updated content (to D in FIG. 8). Specifically, for instance, the request destination node updates a current node name 411, an access frequency 417, the last access date and time 419, a cache slot number 46, and such of the target data in the global cache management table 307.

In S757, the request destination node updates own cache capacity management table 309, and ends processing. Specifically, for instance, the request source node updates the usage amount 505, the free capacity 509, and the receiving amount 507 of the cache capacity management table 309 to values obtained after storing the target data in own cache 36.

By the processing described above, the target data that cannot be stored in the cache 36 of the request source node can be stored in the cache 36 of the request destination. Thus, even when the request source node cannot store the target data in a cache, the target data can be stored in the cache 36 of the other node included in the global cache 300.

FIG. 10 is a flowchart of the storing determination processing of the request destination node accompanying a notification of updated content of the global cache management table.

The processing is performed by the request destination node upon receiving a notification of S713 or S735 of the storing determination processing of the request source node (from A in FIG. 7, 8).

In S761, the request destination node receives a notification of updated content of the global cache management table 307 from the request source node. By following the notification, own global cache management table 307 is updated. For instance, the updated content is a determination of storing the target data in the cache 36 of the request source node or a discard of the data from the global cache 300. Therefore, when the target data is stored in the cache 36 of the request destination node, an area of the target data is required to be released.

In S763, the request destination node refers to the global cache management table 307, and determines whether the target data is stored in own cache 36. As a result of determination, when the target data is not stored (S763: No), processing is ended. On the other hand, as a result of the determination, when the target data is stored (S763: Yes), an area of the target data is released from own cache 36 (S765), the cache capacity management table 309 is updated (S767), and processing is ended. Specifically, for instance, the request destination node updates the usage amount 505, the free capacity 509, and the receiving amount 507 of the cache capacity management table 309 to values obtained after releasing the area of the target data from own cache 36.

By the processing described above, the request destination node that receives a notification of the updated content of the global cache management table 307 from the request source node in the cache 36 of which the target data is stored, when the target data is stored in own cache 36, can release a cache area of the target data. Thus, duplication of the target data of the global cache 300 is excluded and an area of the global cache can be effectively utilized.

Figure 11:
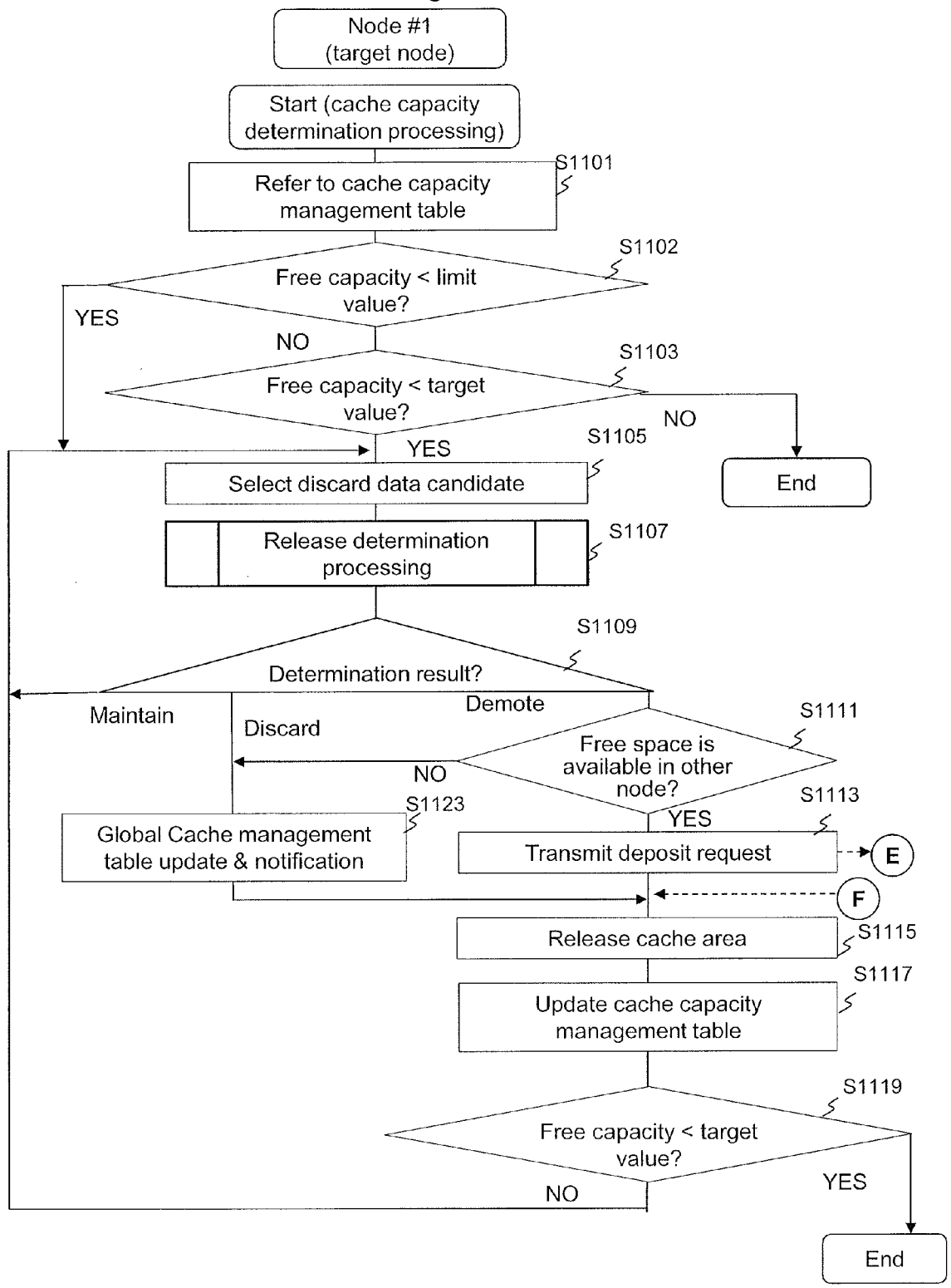
FIG. 11 is a first part of cache capacity determination processing of own node.
Figure 12:
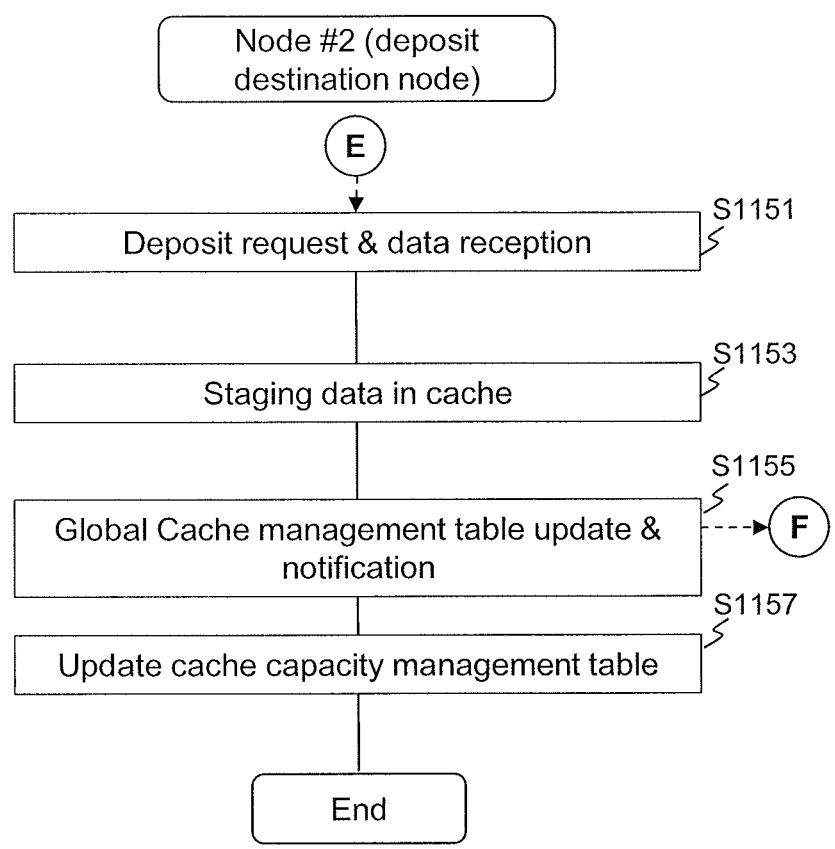
FIG. 12 is a second part of the cache capacity determination processing of own node.

FIG. 11 is a first part of the cache capacity determination processing of own node. FIG. 12 is a second part of the cache capacity determination processing of own node.

The cache capacity determination processing is one example of global cache control processing, and is performed by each node in the storage system regularly or irregularly. The processing is performed by the CPU 32 of each node executing own cache control program 301. In the following description, a storage apparatus that performs processing is referred to as a target node (for instance, node #1).

In S1101, the target node refers to own cache capacity management table 309. The target node determines whether the free capacity 509 of the table 309 is less than a limit value of the free capacity threshold 513 with respect to own cache 36.

As a result of determination, when the free capacity is less than the limit value (S1102: Yes), since this means that there is no margin at all (a tight state) in the cache 36, processing of the target node advances to processing in S1105. On the other hand, as a result of the determination, when the free capacity exceeds the limit value (S1102: No), the target node determines whether the free capacity 509 of the table 309 is less than a target value of the free capacity threshold 513 (S1103).

As a result of determination, when the free capacity is less than the target value (S1103: Yes), since this means that a margin in the cache 36 is small, processing of the target node advances to processing in S1105. On the other hand, as a result of the determination, when the free capacity exceeds the target value (S1102: No), since this means that there is a sufficient margin in the cache 36, the target node ends processing.

In S1105, the target node selects a data candidate to be discarded from own cache 36. Specifically, for instance, the target node refers to the global cache management table 307, and may select data in own virtual VOL. For instance, the target node may select, as a data candidate to be discarded, one piece of data in ascending order of access frequency, may select, as a data candidate to be discarded, one piece of data in chronological order of accessing date and time, may select arbitrary one piece of data as a data candidate to be discarded, or may select a data candidate to be discarded by other methods.

In S1107, the target node performs release determination processing for determining whether a cache area of the data candidate to be discarded is to be released. The processing will be described later.

In S1109, the target node determines a next step on the basis of the determination result of the release determination processing. Specifically, when the determination result indicates that the data candidate to be discarded is stored without any modification in the cache 36 (determined that the data candidate to be discarded is stored in a cache of own node) (S1109: maintain), the target node returns processing to S1105, and selects a data candidate to be discarded next.

When the determination result indicates that the data candidate to be discarded is to be discarded from the cache 36 (S1109: discard), the target node updates own global cache management table 307, and notifies the other node in the storage system of updated content of the global cache management table 307 in S1123. In this case, the updated content is a discard of the target data from the global cache 300, specifically, deletion of an entry of the target data. The other node that receives the notification of the updated content of the global cache management table 307 updates own global cache management table 307 according to the notification.

When the determination result indicates that the data candidate to be discarded is to be migrated (demoted) to the cache of the other node in the storage system (determined that the data candidate to be discarded is to be stored in the cache of the other node) (S1109: demote), in S1111 the target node refers to the cache capacity management table 309 and determines whether a node exists, which has the cache 36 having a free capacity 509 enough to store the data candidate to be discarded.

As a result of the determination, when no node having the cache 36 that can store the data candidate to be discarded exists (S1111: No), processing of the target node advances to processing in S1123. On the other hand, as a result of the determination, when a node having the cache 36 that can store the data candidate to be discarded exists (S1111: Yes), the target node transmits to that node a deposit request for the data candidate to be discarded (deposit destination node) (S1113) (to E in FIG. 12).

After updated content of the global cache management table 307 described later is notified from the deposit destination node (from F in FIG. 12), the target node releases an area of the data candidate to be discarded from own cache 36 (S1115), and updates the cache capacity management table 309 (S1117). Specifically, for instance, the target node updates the usage amount 505, the free capacity 509, and the deposit amount 511 of the cache capacity management table 309 to values obtained after releasing the area of the data candidate to be discarded from own cache 36.

In S1119, the target node determines whether a free capacity of own cache 36 is sufficient, in other words, whether a free capacity 509 of the cache capacity management table 309 is less than the target value of the free capacity threshold 513. As a result of the determination, when the free capacity is less than the target value (S1119: Yes), the target node ends processing. On the other hand, as a result of the determination, when the free capacity exceeds the target value (S1119: No), the target node returns processing to S1105, and selects a data candidate to be discarded next.

By the processing described above, when, concerning each node to be processed, a free capacity of own cache 36 becomes smaller than a predetermined threshold, a determination can be made as to how to handle data for each data stored in the cache memory 36, in other words, whether to maintain in the original cache 36, migrate to the other node, or discard from the global cache 300.

FIG. 12 is data deposit processing on the basis of a deposit request in the cache capacity determination processing (from E in FIG. 12). In the following description, a node in which the target node transmits a deposit request for data candidate to be discarded is referred to as a deposit destination node.

In S1151, the deposit destination node receives a deposit request and a data candidate to be discarded from the target node.

The deposit destination node stores the data candidate to be discarded in own cache 36 by following the deposit request (S1153), updates own global cache management table 307, and notifies the other node in the storage system of updated content of the global cache management table 307 (S1155) (to F in FIG. 11). In this case, the updated content is to be stored in own cache 36 of the target data, specifically, the current node name 411, the access frequency 417, the last access date and time 419, the cache slot number 429, and such.

In S1157, the deposit destination node updates the cache capacity management table 309. Specifically, for instance, the deposit destination node updates the usage amount 505, the free capacity 509, and the receiving amount 507 of own cache 36 to values in a state where the target data is stored.

By the processing described above, when an amount of data stored in the cache 36 of the target node exceeds the predetermined threshold, part of the stored data can be stored in the cache of the other node constituting the global cache.

Figure 13:
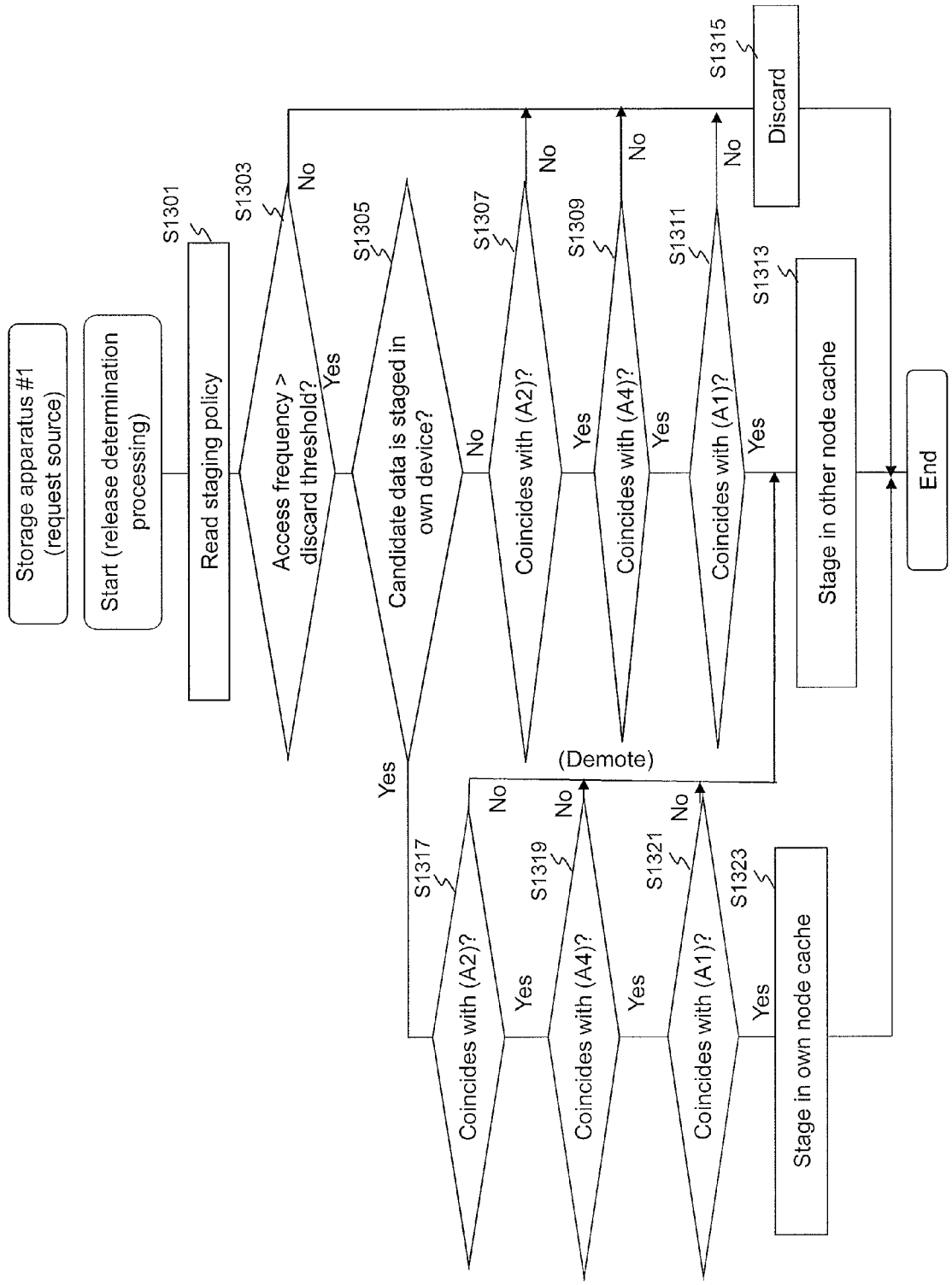
FIG. 13 is a flowchart of release determination processing.

FIG. 13 is a flowchart of the release determination processing. The release determination processing is processing of S1107 of the cache capacity determination processing. In the processing, concerning the data candidate to be discarded selected in S1105, the target node performs the following processing.

In S1301, the target node reads the policy 311 stored in memory 33. As described above, in the present embodiment, policies are the required performance policy (A1), the data characteristic policy (A2), the data capacity policy (A3), and the Tier interlocking policy (A4).

In S1303, the target node refers to own global cache management table 307, and determines whether the access frequency 417 of the data candidate to be discarded is higher than a preconfigured threshold (discard threshold). As a result of the determination, when the access frequency 417 of the data candidate to be discarded is equal to or less than the discard threshold (S1303: No), the target node determines to "discard" the data candidate to be discarded (S1315), and ends processing.

On the other hand, as a result of the determination, when the access frequency 417 of the data candidate to be discarded is higher than the discard threshold (S1303: Yes), the target node determines whether the data candidate to be discarded is stored in own cache 36 (S1305).

As a result of the determination, when the data candidate to be discarded is stored (S1307: Yes), processing of the target node advances to processing in S1317. On the other hand, as a result of the determination, when the data candidate to be discarded is not stored (S1307: No), processing of the target node advances to processing in S1307.

In S1317, the target node determines whether the data candidate to be discarded coincides with the data characteristic policy (A2). Specifically, for instance, the target node refers to the global cache management table 307, and determines whether the Sequential flag 431 is "ON". When the Sequential flag 431 is "ON" (S1317: Yes), since this means that the data candidate to be discarded is a sequential data, processing of the target node advances to processing in S1319. On the other hand, when the Sequential flag 431 is "OFF" (S1317: No), since this means that the data candidate to be discarded is not a sequential data, processing of the target node advances to processing in S1313.

In S1319, the target node determines whether the data candidate to be discarded coincides with the Tier interlocking policy (A4). Specifically, for instance, the target node refers to the global cache management table 307, determines whether the Tier information 409 of the data candidate to be discarded is "T1". When the Tier information 409 is "T1" (S1319: Yes), since this means that the target data belongs to Tier 1, processing of the request source node advances to processing in S1321. On the other hand, when the Tier information 409 is not "T1" (S1319: No), since this means that the target data belongs to a Tier other than Tier 1, processing of the target node advances to processing in S1313.

In S1321, target node determines whether the data candidate to be discarded coincides with the required performance policy (A1). Specifically, for instance, target node refers to the global cache management table 307, and determines whether the Cache Residency 427 of the target data is "ON". When the Cache Residency 427 is "ON" (S1321: Yes), since this means that the data candidate to be discarded is a Cache Residency, processing of the request source node advances to processing in S1323. On the other hand, when the Cache Residency 427 is "OFF" (S1321: No), since this means that the data candidate to be discarded is not a Cache Residency, processing of the target node advances to processing in S1313.

In S1323, the target node determines to maintain the data candidate to be discarded stored in own cache 36 (storing in own node), and ends processing.

In S1307, the target node determines whether the data candidate to be discarded coincides with the data characteristic policy (A2). Specifically, for instance, the target node refers to the global cache management table 307, and determines whether the Sequential flag 431 of the data candidate to be discarded is "ON". When the Sequential flag 431 is "ON" (S1307: Yes), processing of the target node advances to processing in S1309. On the other hand, when the Sequential flag

431 is "OFF" (S1307: No), processing of the target node advances to processing in S1315.

In S1309, target node determines whether the data candidate to be discarded coincides with the Tier interlocking policy (A4). Specifically, for instance, the target node refers to the global cache management table 307, and determines whether the Tier information 409 of the data candidate to be discarded is "T1". When the Tier information 409 is "T1" (S1309: Yes), processing of the target node advances to processing in S1311. On the other hand, the Tier information 409 is not "T1" (S1309: No), processing of the target node advances to processing in S1315.

In S1311, the target node determines whether the data candidate to be discarded coincides with the required performance policy (A1). Specifically, for instance, the target node refers to the global cache management table 307, and determines whether the Cache Residency 427 of the target data is "ON". When the Cache Residency 427 is "ON" (S1311: Yes), processing of the request source node advances to processing in S1313. On the other hand, the Cache Residency 427 is "OFF" (S1311: No), processing of the target node advances to processing in S1315.

In S1313, the target node determines to store the data candidate to be discarded in the cache 36 of the other node, and ends processing.

By the processing described above, a location of the data candidate to be discarded can be determined on the basis of the degree of importance of data on the basis of the policy.

Specifically, out of the data candidate to be discarded stored in the cache 36 of own node, the important data candidate to be discarded can be maintained, and the data candidate to be discarded of no importance can be demoted to the other node. Concerning the data candidate to be discarded stored in the other node, the important data candidate to be discarded can be maintained, and the data candidate to be discarded of no importance can be discarded from the global cache 300.

Example 2

Next, Example 2 is described.

Tier interlocking processing associated with the present embodiment is described. The Tier interlocking processing is one example of cache control processing, is performed regularly or irregularly by each node in the storage system. The processing is performed by the CPU 32 of each node executing own cache control program 301.

Tier interlocking processing is performed based on a change in a Tier of each data implemented by the Tier control program 313 executed by the CPU of each node. As described above, the storage area in the virtual VOL is hierarchized according to a performance of a base drive. Therefore, to which Tier each data is stored is allocated according to a degree of importance such as the access frequency, and when the degree of importance varies, a Tier in which the data is stored is also changed.

In the present embodiment, in each storage apparatus, as represented by the global cache management table 307, each data stored in the global cache 300 is associated with the Tier information 409 (Tier). Each node configures the Tier information 409 of each data on the basis of data information (the access frequency 417 and the last access date and time 419 for each data, and such), and by the data information being varied, the Tier information 409 of each data is properly changed. For instance, the CPU of each node measures the data information of all data stored in own node with the access frequency measurement program 303 stored in the memory 33, and the Tier information of each data is changed. In the memory 33 of each node, a target data list is stored that is a list of data stored in the virtual VOL of own node whose Tier information is required to be changed.

In the present embodiment, two examples are described in the Tier interlocking processing, that are a case where data stored in the global cache 300 is changed from an upper Tier to a lower Tier (Tier 1→Tier 2) and a case where the data is changed from a lower Tier to an upper Tier (Tier 2→Tier 1). The target data list includes an upgrade data list that is a list of data that is changed from an upper Tier to a lower Tier and a downgrade data list that is a list of data that is changed from a lower Tier to an upper Tier.

Figure 14:
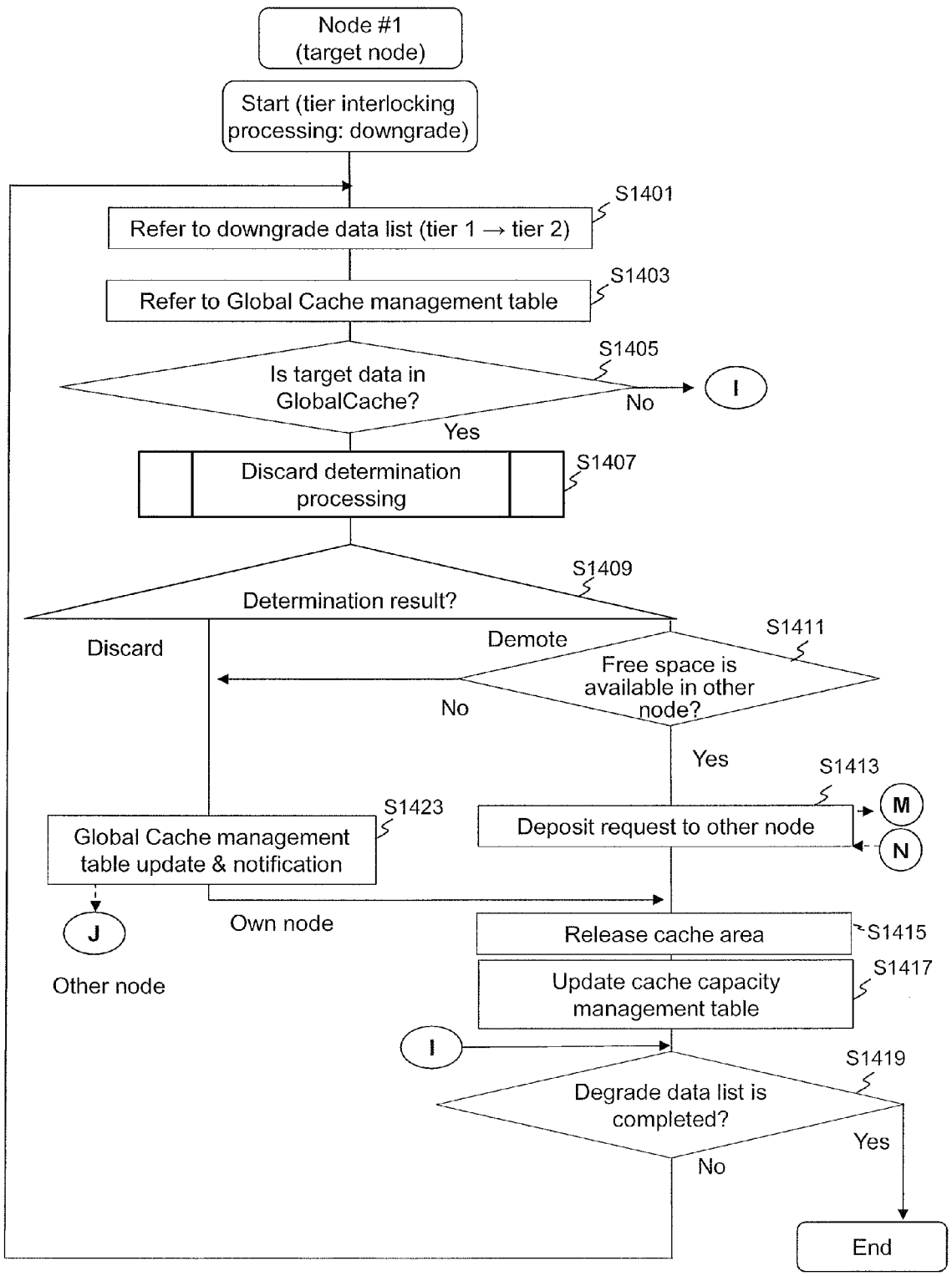
FIG. 14 is a first part of a flowchart of Tier interlocking processing at a time of level downgrading in Tier.

FIG. 14 is a first part of a flowchart of the Tier interlocking processing at a time of level downgrading in Tier. In the following description, a storage apparatus that performs processing is referred to as a target node.

In S1401, the target node refers to the downgrade data list and selects one piece of data listed in the downgrade data list. In the description, the selected data is referred to as the target data.

The target node refers to the global cache management table (S1403), and determines whether the target data exists in the global cache management table 307 (S1405).

As a result of the determination, when the target data does not exist in the global cache management table 307 (S1405: No), the target node deletes the target data from the downgrade data list and advances to processing in S1419 (to I in the figure). On the other hand, when the target data exists in the global cache management table 307 (S1405: Yes), the target node performs the release determination processing described above in S1407 (refer to FIG. 13). As for the release determination processing in the processing, the data candidate to be discarded shall be replaced with the target data. In the release determination processing in the processing, the target data never satisfies the Tier interlocking policy (A4) for data whose level in Tier is downgraded. Therefore, the target data is kept with modification in the cache 36 where the target data is stored.

In S1409, the target node determines a next step on the basis of the determination result of the release determination processing. When discarding the target data from the cache 36 is indicated (S1409: discard), the target node updates own global cache management table 307, and notifies the other node in the storage system of the updated content (S1423). In this case, the updated content is a discard of the target data from the global cache 300, specifically, deletion of an entry of the target data. When the target data is stored in the cache 36 of own node (own node), processing of the target node advances to processing in S1415. When the target data is stored in the cache 36 of the other node (other node), processing of the target node advances to processing in S1431 (to J in FIG. 15).

In S1409, when storing the target data in the cache 36 of the other node in the storage system (storing the target data in the cache of other node is determined) (S1409: demote), the target node refers to the cache capacity management table 309 in S1411 and determines whether a node having the cache 36 having a free capacity 509 sufficient for storing the target data exists.

As a result of the determination, when a node having the cache 36 in which the target data can be stored does not exist (S1411: No), processing of the target node advances to processing in S1423. On the other hand, as a result of the determination, when a node having the cache 36 in which the target data can be stored exists (S1411: Yes), the target node transmits a deposit request of the target data to the node (deposit destination node) (S1413) (to M in FIG. 16).

After a response from the deposit destination node (from N in FIG. 16), or after S1423, the target node updates own global cache management table 307 and releases an area of the target data from own cache 36 (S1415). The target node updates the cache capacity management table 309 (S1417). Specifically, for instance, the target node updates the usage amount 505 and the free capacity 509 of the cache capacity management table 309 to values obtained after discarding the target data from own cache 36. The target node deletes the target data from the downgrade data list and processing of the target node advances to processing in S1419.

In S1419, the target node determines whether data is listed in the downgrade data list. When no data exists (S1419: No), the target node returns processing to S1405. On the other hand, when data exists (S1419: Yes), the target node ends processing.

By the processing described above, whether to discard the target data changed from an upper Tier to a lower Tier (Tier 1→Tier 2) from the global cache 300 according to a degree of importance of the target data can be determined. Even when the target data is to be maintained in the global cache 300, the target data can be migrated to the cache 36 of the other node.

Figure 15:
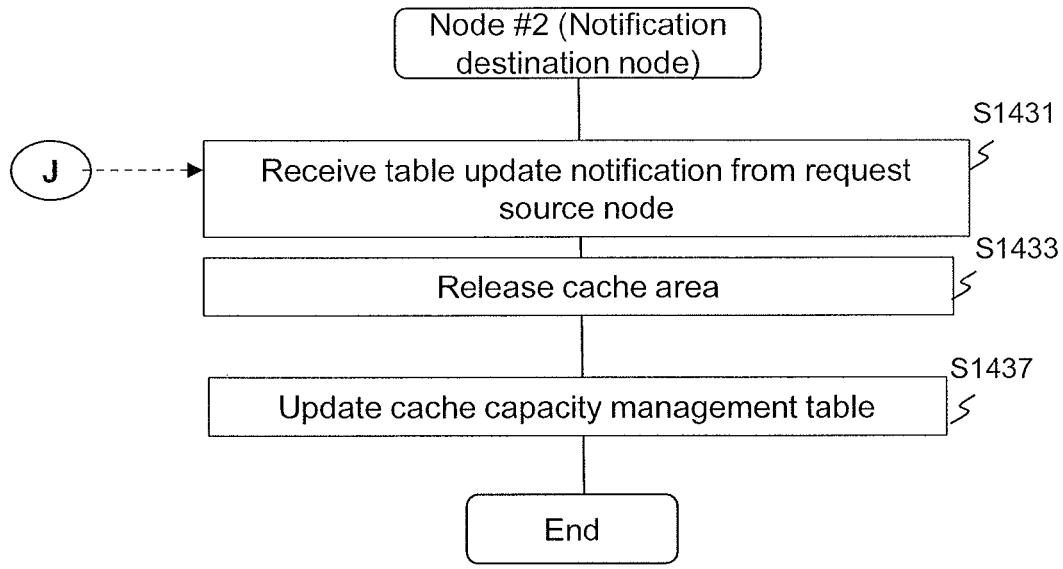
FIG. 15 is a second part of the flowchart of the Tier interlocking processing at a time of level downgrading in Tier.

FIG. 15 is a flowchart of data discarding processing of a notification destination node accompanying a notification of the updated content of the global cache management table 307.

The processing is performed by the notification destination node upon receiving a notification of the Tier interlocking processing of the target node in S1423 (from J in FIG. 14).

In S1431, the notification destination node receives the notification of the updated content of the global cache management table 307 from the target node and updates own global cache management table 307 by following the notification. For instance, the updated content is deletion from the global cache 300, specifically, deletion of the entry of the target data.

In S1433, the notification destination node releases an area of the target data from own cache 36, updates the cache capacity management table 309 (S1437), and ends processing. Specifically, for instance, the notification destination node updates the usage amount 505 and the free capacity 509 of the cache capacity management table 309 to values obtained after discarding the target data from own cache 36.

By the processing described above, the notification destination node can release a cache area of the target data. Thus, data of a low degree of importance can be deleted from the global cache 300, and an area of the global cache can be efficiently utilized.

Figure 16:
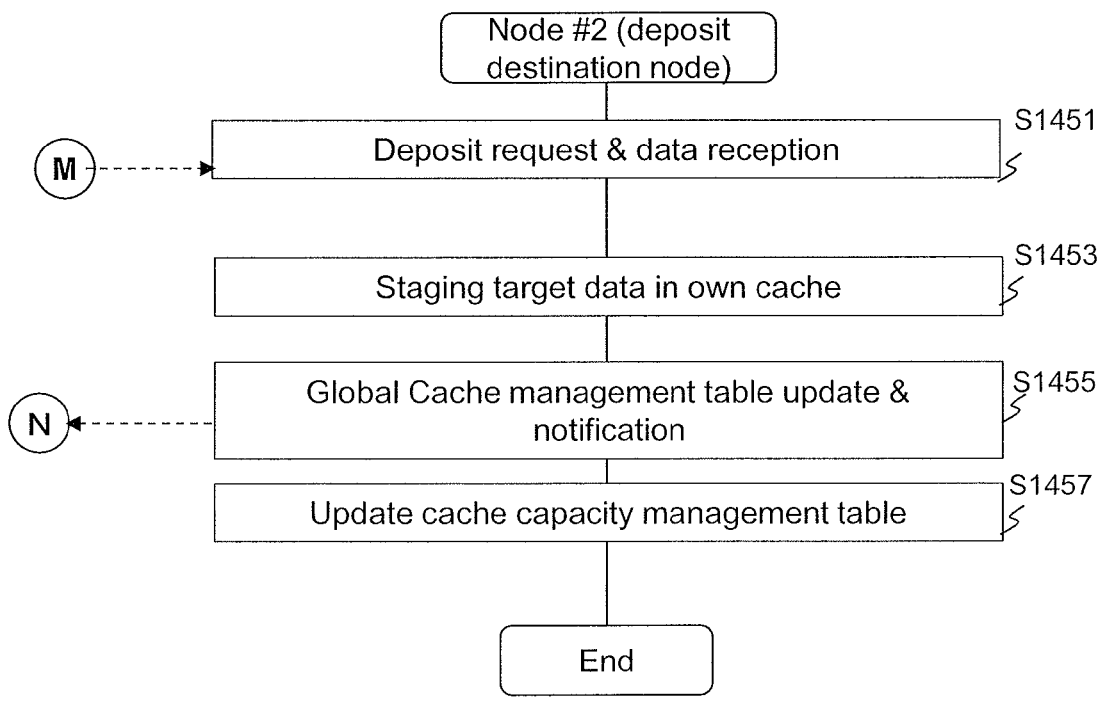
FIG. 16 is a third part of the flowchart of the Tier interlocking processing at a time level downgrading in Tier.

FIG. 16 is the data deposit processing on the basis of a deposit request in the Tier interlocking processing (from M in FIG. 14).

In S1451, the deposit destination node receives a deposit request and the data candidate to be discarded from the target node.

The deposit destination node stores the data candidate to be discarded in own cache 36 by following the deposit request (S1453), updates own global cache management table 307, and notifies the other node in the storage system of the updated content of the global cache management table 307 (S1455) (to N in FIG. 14). In this case, the updated content is to be stored in own cache 36 of the target node, specifically, the current node name 411, the access frequency 417, the last access date and time 419, the cache slot number 429, and such.

In S1457, the deposit destination node updates the cache capacity management table 309. Specifically, for instance, the deposit destination node updates the usage amount 505 and the free capacity 509 of own cache 36 to values in a state where the target data is stored.

By the processing described above, when a data amount stored in the cache 36 of the target node exceeds a predetermined threshold, part of the stored data can be stored in the cache of the other node constituting the global cache.

Figure 17:
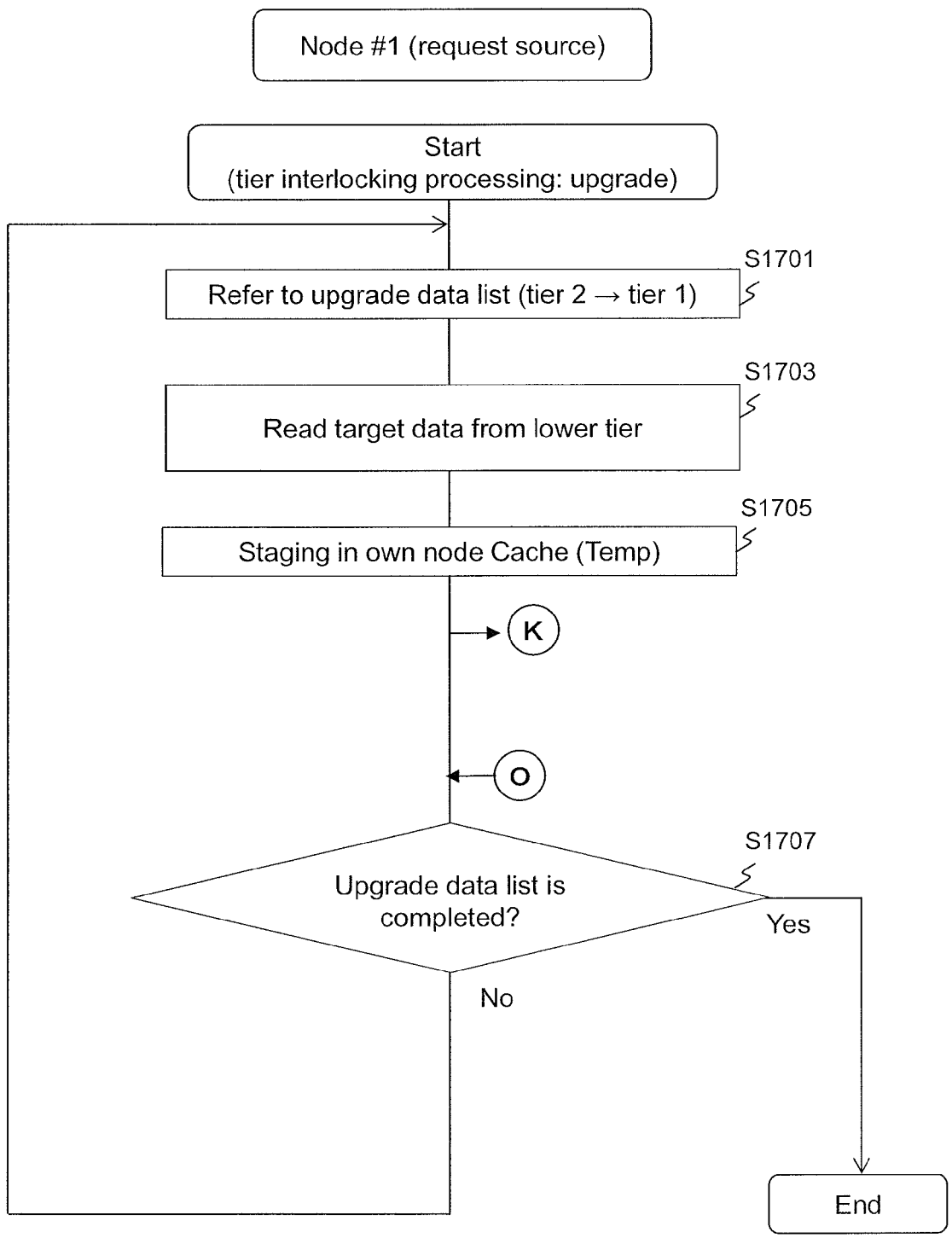
FIG. 17 is a first part of a flowchart of Tier interlocking processing at a time of level upgrading in Tier.
Figure 18:
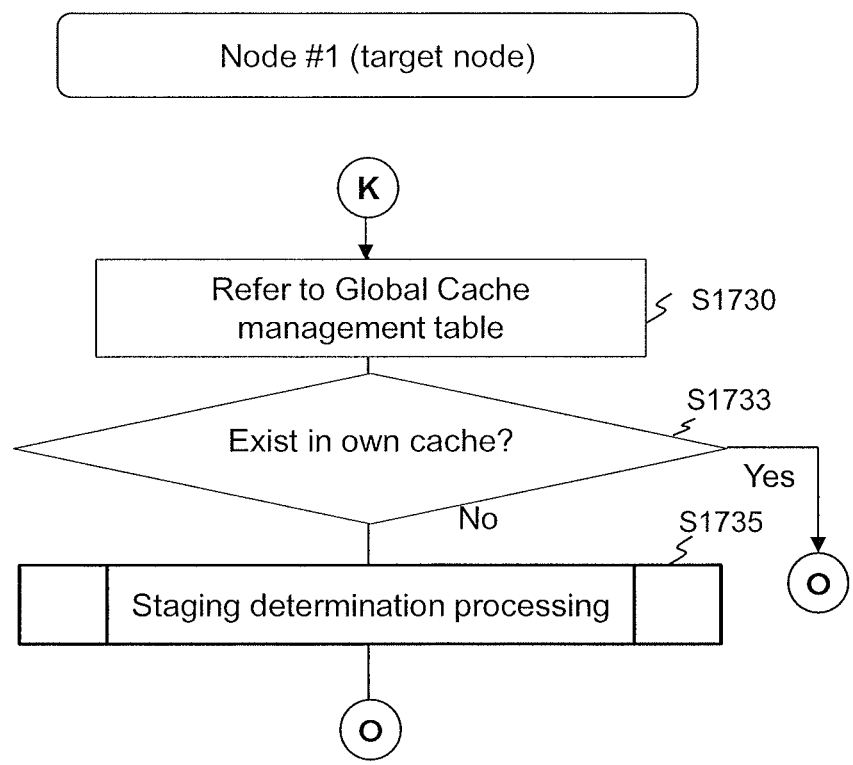
FIG. 18 is a second part of the flowchart of the Tier interlocking processing at a time level upgrading in Tier.

FIG. 17 is a first part of a flowchart of the Tier interlocking processing at a time of level upgrading in Tier. FIG. 18 is a second part of the flowchart of the Tier interlocking processing at a time of Tier level upgrading in Tier.

In the following description, a storage apparatus that performs processing is referred to as a target node. The Tier interlocking processing in FIG. 17 is performed by the CPU 32 of the target node executing the Tier control program 313 stored in the memory 33, and the Tier interlocking processing in FIG. 18 is performed by the Tier control program 313 handing over processing to the global cache control program 305.

In S1701, the target node refers to the upgrade data list, and selects one piece of data listed in the upgrade data list. In the description, the selected data is referred to as the target data.

The target node reads the target data from own disk unit 40 (S1703), temporarily stores in own cache 36 (S1705), and advances to processing in S1730 (to K in FIG. 18).

After taking over processing from O in FIG. 18, in S1707 the target node determines whether data listed in the upgrade data list exists. When no data exists (S1707: No), the target node returns processing to S1701. On the other hand, when data exists (S1707: Yes), the target node ends processing.

Processing is continued to K in FIG. 18. The target node refers to the global cache management table (S1730), and determines whether the target data is stored in own cache 36. As a result of the determination, when the data is stored in own cache 36 (S1733: Yes), the target node deletes the target data from the upgrade data list and advances to processing in S1707. On the other hand, as a result of the determination, when the data is not stored in own cache 36 (S1733: No), in other words, when the target data does not exist in the global cache management table 307 or although the data exists in the global cache management table 307, the data is stored in the cache 36 of the other node, the target node performs the storing determination processing described above (refer to FIG. 7 to 10), and processing of the target node advances to processing in S1707. As for the storing determination processing of the processing, the request source node shall be replaced with the target node.

By the processing described above, the data that is changed from a lower Tier to an upper Tier (Tier 2→Tier 1) can be stored in the global cache 300, and whether to store the target data in own cache 36 or in the cache 36 of the other node can be determined according to a degree of importance. By storing the data upgraded to an upper Tier in the cache of own node, I/O performance can be improved compared to a case where the data is stored in the cache of the other node.

Example 3

Next, Example 3 is described.

Cache capacity determination processing associated with the present embodiment is described. The cache capacity determination processing is one example of the global cache control processing, and is performed by each node in the storage system regularly or irregularly. The processing is performed by the CPU 32 of each node executing own cache control program 301. In the following description, a storage apparatus that performs processing is referred to as the target node (for instance, node #1).

In the description above, the cache capacity determination processing of own node is described (FIG. 11, 12). In the present embodiment, the target node performs the cache capacity determination for the other node. The target node, when a cache capacity of the other node is tight, determines whether the data deposited in the other node is to be discarded. When the data is to be stored (to be maintained) in the global cache, when the cache of the target node has a sufficient free space, the target node accepts the target data in own cache. When own cache does not have a sufficient free space, the target node searches for another node whose cache has a free space, and deposits the target data through own node. The target node may set an execution interval of the cache capacity determination processing of the other node wider than an execution interval of the cache capacity determination processing of own node.

Figure 19:
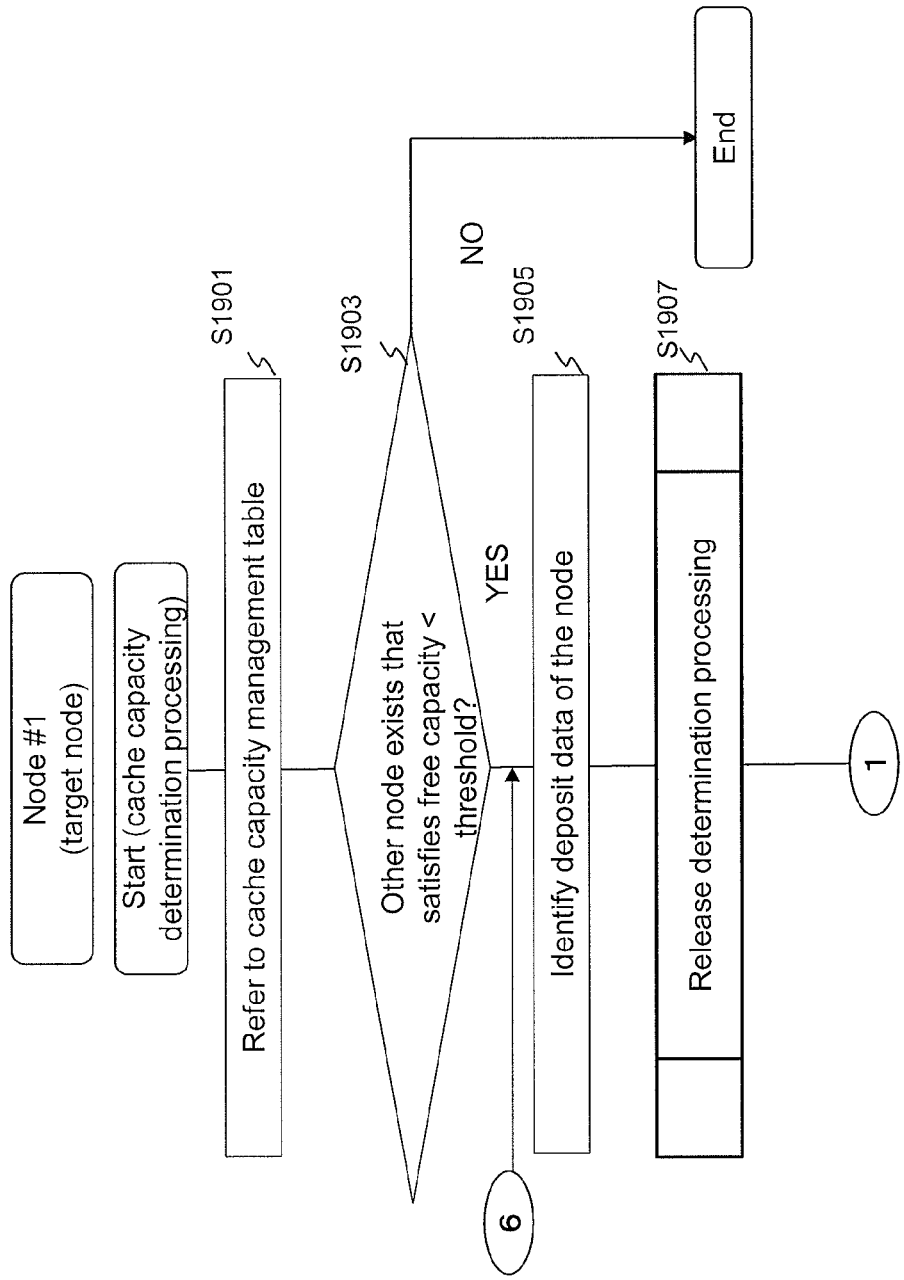
FIG. 19 is a first part of a flowchart of the cache capacity determination processing of other nodes.
Figure 20:
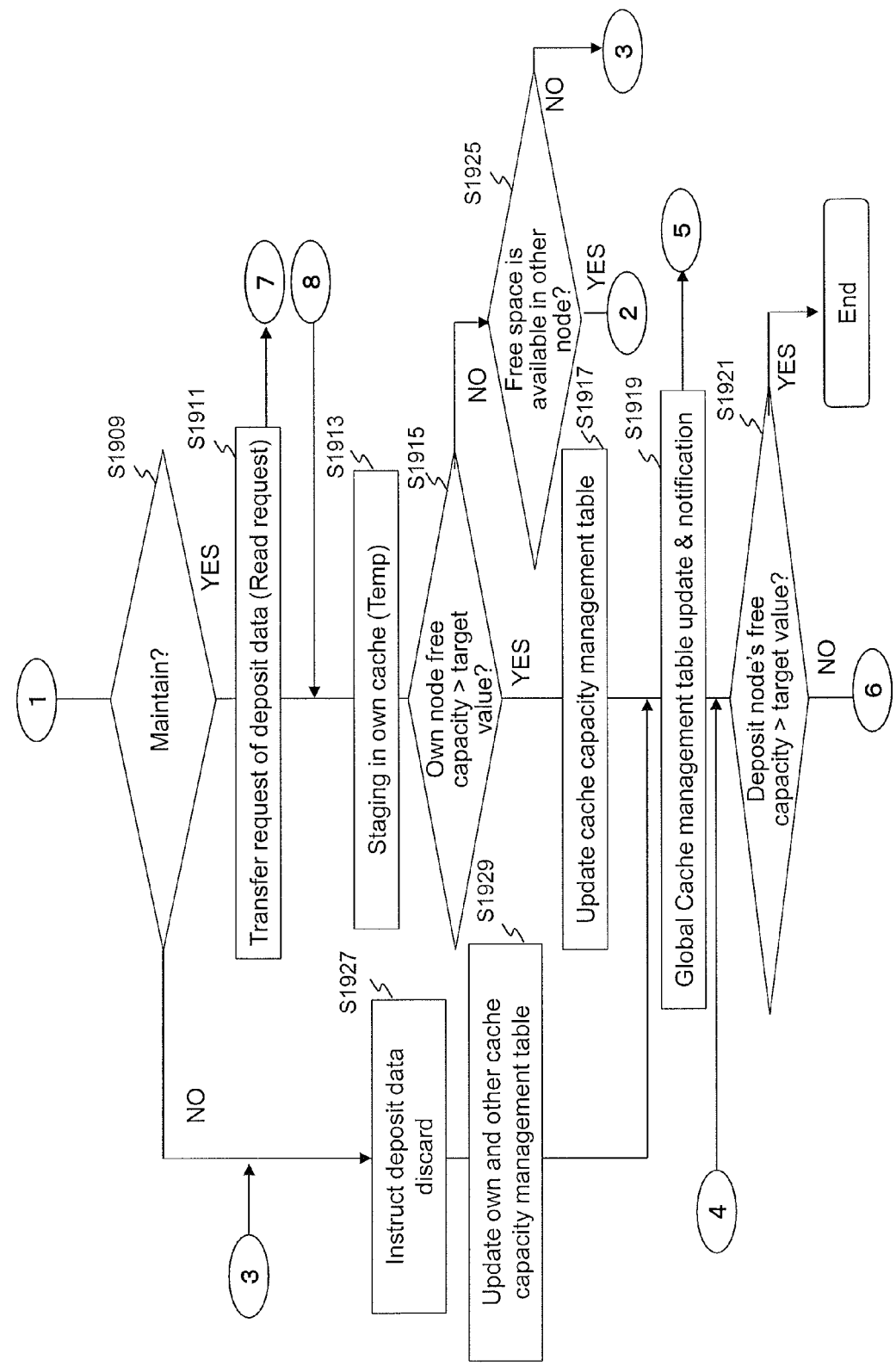
FIG. 20 is a second part of the flowchart of the cache capacity determination processing of other nodes.
Figure 21:
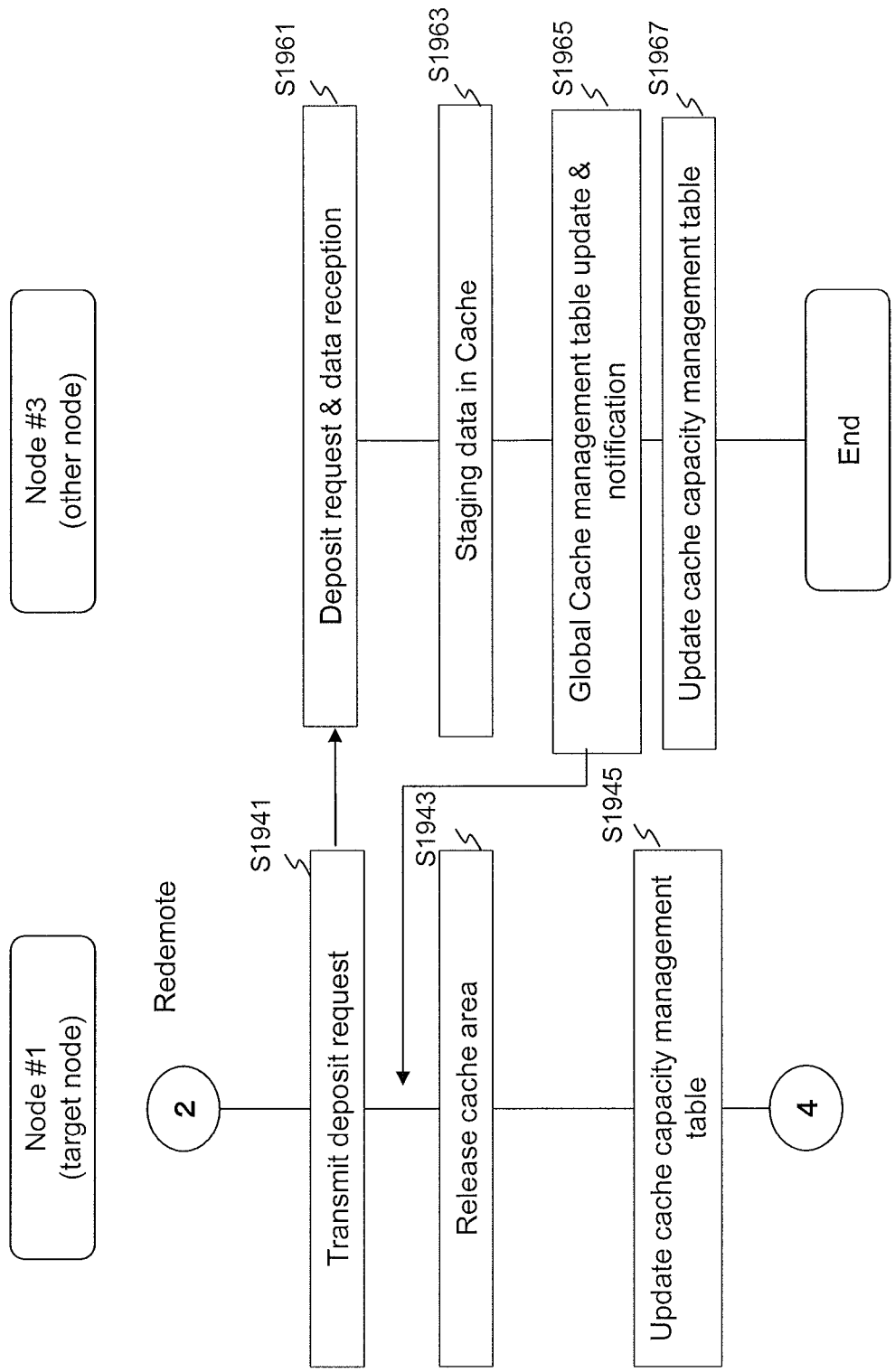
FIG. 21 is a third part of the flowchart of the cache capacity determination processing of other nodes.

FIG. 19 is a first part of a flowchart of the cache capacity determination processing of the other node. FIG. 20 is a second part of the flowchart of the cache capacity determination processing of the other node. FIG. 21 is a third part of the flowchart of the cache capacity determination processing of the other node. FIG. 22 is a fourth part of the flowchart of the cache capacity determination processing of the other node.

In S1901, the target node refers to the cache capacity management table 309. The target node determines whether the other node whose free capacity 509 is less than the limit value of the free capacity threshold 513 exists (S1903). A free capacity threshold 513 (especially, a limit value) of the other node in the cache capacity management table 309 may be configured higher than the target node (own node). By configuring so, the target node may accept data of the other node more easily.

As a result of the determination, when no other node has a free capacity less than the limit value (S1903: No), since this means that the cache 36 of any of the other nodes has a sufficient margin, the target node ends processing. On the other hand, as a result of the determination, when another node whose free capacity is less than the limit value (S1903: Yes), one piece of data is identified out of data stored in the cache 36 of the other node (deposit node) (S1905). The identified data is the data the target node deposits. Hereinafter, the identified data is referred to as the deposit data. In S1907, the target node performs the release determination processing and processing of the target node advances to processing in S1909 (to 1 in FIG. 20). The release determination processing here is a determination as to whether to release a cache area corresponding to the deposit data of the deposit node. The specific processing is as described in FIG. 13. As for the release determination processing of the processing, the data candidate to be discarded shall be replaced with the deposit data.

In S1909, the target node determines whether to maintain the deposit data in the global cache 300.

As a result of the determination, when the deposit data is to be maintained in the global cache 300 (S1909: Yes), the target node transmits a transfer request of the deposit data to the deposit node (S1911) (to 7 in FIG. 22), waits for a transfer from the deposit node (from 8 in FIG. 22), and stores the deposit data in own cache 36.

In S1915, the target node, concerning the cache capacity management table 309, determines whether the free capacity 509 of own cache is less than the target value of the free capacity threshold 513.

As a result of the determination, when the free capacity exceeds the target value (S1915: Yes), since this means that the cache 36 has a sufficiently margin, the target node determines to store the deposit data in own cache 36, updates the cache capacity management table 309 (S1917), and advances to processing in S1919. Specifically, for instance, the target node updates the usage amount 505, the free capacity 509, and the deposit amount of the cache capacity management table 309 to values obtained after storing the deposit data in own cache 36.

On the other hand, as a result of the determination, when the free capacity is less than the target value (S1915: No), since this means that the cache 36 has a little margin, the target node determines whether the cache 36 of the other node has a free space (S1925). As a result of the determination, when the cache 36 of the other node has a free space (S1925: Yes), processing of the target node advances to processing in S1941 (to 2 in FIG. 21). On the other hand, as a result of the determination, when the cache 36 of the other node has no free space (S1925: No), processing of the target node advances to processing in S1927 (to 3 in the figure).

As a result of the determination in S1909, when the deposit data is to be discarded from the global cache 300 (S1909: No), or (from 3 in the figure), when the cache of the other node has no free space, the target node instructs the deposit node to discard the deposit data (S1927), updates the cache capacity management table 309, and advances to processing in S1919.

In S1919, the target node updates own global cache management table 307, notifies the other node in the storage system of the updated content (to 5 in FIG. 22), and advances to processing in S1921. In this case, the updated content is storing the target data in own cache 36, specifically, the current node name 411, the access frequency 417, the last access date and time 419, the cache slot number 429, and such.

In S1921, the target node determines, concerning the cache capacity management table 309, whether a free capacity 509 of the cache of the deposit node is less than the target value of the free capacity threshold 513.

As a result of the determination, when the free capacity exceeds the target value (S1921: Yes), since this means that the cache 36 has a sufficiently margin, the target node ends processing. On the other hand, as a result of the determination, when the free capacity is less than the target value (S1921: No), since this means that the cache 36 has a little margin, the target node determines whether the cache 36 of the other node has a free space (S1925). As a result of the determination, when the cache 36 of the other node has a free space (S1925: Yes), processing of the target node advances to processing in S1941 (to 2 in FIG. 21). The node that is determined to have a free space in the cache 36 is referred to as a free node. On the other hand, as a result of the determination, when the cache 36 of the other node has no free space (S1925: No), the target node returns processing to S1903 (to 6 in FIG. 19).

Processing of the target node in FIG. 21 is described. In S1941, the target node transmits a deposit request of the deposit data to the free node (to S1961), waits for a response from the free node, releases an area of the deposit data from own cache 36 (S1943), updates the cache capacity management table 309 (S1945), and returns processing to S1421 (to 4 in FIG. 20). Specifically, for instance, the target node updates the usage amount 505 and the free capacity 509 of the cache capacity management table 309 to values obtained after discarding the deposit data from own cache 36.

Processing of the free node in FIG. 21 is described. The free node receives a deposit request and the deposit data from the target node (S1961), and stores the deposit data in own cache 36 on the basis of the deposit request. In S1965, the free node updates own global cache management table 307, and notifies the request source node of the updated content (to S1943). Specifically, for instance, the free node updates the current node name 411, the access frequency 417, the last access date and time 419, the cache slot number 46 of the deposit data, and such of the global cache management table 307.

In S1967, the free node updates own cache capacity management table 309, and ends processing. Specifically, for instance, the free node updates the usage amount 505, the free capacity 509, and the receiving amount 507 of the cache capacity management table 309 to values obtained after storing the deposit data in own cache 36.

Processing of the deposit node in FIG. 22 is described. The deposit node receives a transfer request of the deposit data (S1981) (from 7 in FIG. 20), and transfers the deposit data stored in own cache 36 to the target node (to 8 in FIG. 20). The deposit node waits for the transfer from the deposit node, and stores the deposit data in own cache 36.

After being notified from the target node of the updated content of the global cache management table 307 (from 5 in FIG. 20), the deposit node updates its own global cache management table 307, and releases an area of the deposit data from own cache 36 (S1985). The deposit node updates the cache capacity management table 309 (S1987). Specifically, for instance, the target node updates the usage amount 505, the free capacity 509, and the receiving amount 507 of the cache capacity management table 309 to values obtained after discarding the deposit data from own cache 36.

As described above, by performing the cache capacity determination processing of the other node, even when the free capacity of the cache of the other node is tight, the cache capacity of the other node can be controlled. Especially, when data deposited by the target node exists in the cache of the other node, data of high degree of importance can be accepted from the other node.

When the free capacity of the cache of the target node is also tight, the target node can deposit the target data in another node whose cache capacity has a free space.

As described in the first to third embodiments above, by managing the cache 36 of each node included in the storage system as the global cache 300 and performing cache control taking account of the free capacity of each cache 36 and a degree of importance of the data, use efficiency of the caches 36 of the entire storage system can be improved, and by improving a hit rate of the cache 36 accompanying a read request, responsiveness of the storage system can be improved.

In addition to or in replacement of the embodiments above, by making an extended cache memory 27 in the host computer to be an upper Tier (Tier 0) of a Tier of each storage apparatus, Tier control processing of the entire computer system may be performed. By doing so, use efficiency of the cache memories of not only the storage system but also the entire computer system including the storage system can be improved. Below, the present example is described.

According to the present example, the Tier control processing is performed by the CPU 22 of the host 2 executing the cache control program 301 stored in the memory 21. The Tier control processing is performed by the host 2 adding up for each data the access frequency of the read request transmitted to the storage system, and storing data whose access frequency is higher than a predetermined threshold configured in advance in the extended cache memory 27 as the target data.

In this case, when the target data is read from the storage system, a notification is made to the read request that the target data is to be stored in the cache (extended cache 27) of the host 2. Thus, the node in which the target data is stored can discard (release the cache area) the target data from own cache 36.

When the host 2 detects that the access frequency of the target data is lower than the predetermined threshold, the target data being discarded from the extended cache 27, hence the cache area is released. For instance, the host 2 may have a threshold for determining an upper Tier (for instance, Tier 1) in the storage system. For instance, when the target data exceeds the threshold, the host 2 transmits a verify command that specifies a virtual VOL that is a storing destination of the target data, a virtual LBA, and the block length thereof to the storage system. A node that received the command may store the target data in own cache 36. In this case, the node that has receives the verify command may use read processing in respect of the cache of node in which the target data is to be stored (FIG. 3).

The virtual cache area corresponds to the global cache memory and such, and the management information corresponds to the global cache management table, the degree of importance, and such. The free space area size corresponds to the cache capacity management table and such, the apparatus in charge of a cache corresponds to the current node and such of the global cache management table, and the apparatus in charge of a volume corresponds to the original node and such of the global cache management table.

Although some embodiments are described above, the present invention is not limited to the embodiments, and it goes without saying that the present invention may be variously changed within a range not deviating from the significance thereof.

REFERENCE SIGNS LIST

1 Storage apparatus
2 Host server
30 Controller
40 Disk unit
36 Cache memory
300 Global cache memory

The invention claimed is:
1. A storage system comprising:
a first storage apparatus; and
a second storage apparatus coupled to the first storage apparatus,
each of the first and the second storage apparatuses including:
a microprocessor coupled to a host computer;
a memory coupled to the microprocessor; and
a storage device coupled to the microprocessor,
the microprocessor being configured to provide the host computer with a volume based on the storage device,
the memory including a shared area and a cache area,
the microprocessor of the first storage apparatus being configured to allocate part of the cache area of the first storage apparatus to a virtual cache area,
the microprocessor of the second storage apparatus being configured to allocate part of the cache area of the second storage apparatus to the virtual cache area,
the shared area being configured to store
management information representing data existing in the virtual cache area and a free area size of each of cache areas of the first and the second storage apparatuses, the management information representing association among the data, an apparatus in charge of a cache that is a storage apparatus having a cache area storing the data, an apparatus in charge of a volume that is a storage apparatus having a volume configured to store the data, and a degree of importance representing responsiveness to an input/output (I/O) request from the host computer to the data, the microprocessor of the first storage apparatus being configure to, when a read request to specify first data is received from the host computer, determine whether the first data exists in the virtual cache area based on the management information, when the first data exists in the virtual cache area, determine whether the first data is stored in a first cache area of the first storage apparatus, when the first data is not stored in the first cache area, acquire the first data from a second cache area of the second storage apparatus based on the management information, store the first data in the first cache area, and transmit the first data to the host computer, determine based on the degree of importance whether the first data is to be associated with the first cache area or to be associated with the second cache area, when a determination is made that association with the first cache area is implemented, notify the second storage apparatus to that effect, change an apparatus in charge of a cache of the first data from the second storage apparatus to the first storage apparatus in the management information, and when a determination is made that association with the second cache area is implemented, notify the second storage apparatus to that effect, and delete first data stored in the first cache area.

2. A storage system according to claim 1, wherein
the microprocessor of the second storage apparatus is configured to, when a notification to the effect that the first data is stored in the first cache area is received, delete first data stored in the second cache area, and change an apparatus in charge of a cache of the first data from the second storage apparatus to the first storage apparatus in the management information.

3. A storage system according to claim 2, wherein
the microprocessor of the first storage apparatus is configured to, when the first data does not exist in the virtual cache area, determine whether the first data is stored in a volume of the first storage apparatus, when the first data is stored in the volume of the first storage apparatus, acquire a first data from the first storage device, store the data in the first cache area, then transmit the same to the host computer, when the first data is not stored in a volume of the first storage apparatus, acquire the first data from the second storage apparatus having a volume, in which the first data is stored, based on the management information, store the first data in the first cache area, and transmit the first data to the host computer, and determine whether the first data is to be associated with the first cache area or to be associated with the second cache area based on the degree of importance, when a determination is made that association with the first cache area is implemented, notify the second storage apparatus to that effect, change an apparatus in charge of a cache of the first data from the second storage apparatus to the first storage apparatus in the management information, and when a determination is made that association with the second cache area is implemented, notify the second storage apparatus to that effect, and delete a first data stored in the first cache area.

4. A storage system according to claim 3, wherein
the microprocessor of the first storage apparatus is configured to, when a free area of the first cache area becomes less than a preconfigured own cache threshold, determine a second data to be migrated to the second cache area out of data to be stored in the first cache area according to the degree of importance, transmit the second data to the second storage apparatus, and change an apparatus in charge of a cache of the second data from the first storage apparatus to the second storage apparatus in the management information.

5. A storage system according to claim 4, wherein
the degree of importance includes: an access frequency of each data; a last access date and time of each data; and sequential information representing whether each data is data read by following a sequential access from the host computer.

6. A storage system according to claim 5, wherein
each of the first and second storage apparatuses is configured to perform automatic hierarchization of own volume, the degree of importance further includes tier information representing a tier to which data belongs, and a microprocessor of the first storage apparatus is configured to, when a level in a tier of a third data stored in a volume of the first storage apparatus is downgraded, determine based on the management information whether the third data exists in the virtual cache area, when the third data exists in the virtual cache area, determine based on the management information whether the third data is stored in the first cache area, when the third data is not stored in the first cache area, transmit an instruction to delete the third data to the second storage apparatus, and when the third data is stored in the first cache area, determine whether a free area in which the third data can be stored is available in the second cache area, and when a free area is available, store the third data in a second cache area.

7. A storage system according to claim 6, wherein
the microprocessor of the first storage apparatus is configured to, when a level in a tier of a third data stored in a volume of the first storage apparatus is upgraded, determine based on the management information whether the third data is stored in one of the first cache area and the second cache area, when the third data is not stored in one of the first cache area and the second cache area, store the third data in the first cache area, make a storage apparatus having a cache area configured to store the first data to be the first storage apparatus in the management information, and when the third data is stored in the second cache area, transmit a transfer request of the third data to the second storage apparatus.

8. A storage system according to claim 7, wherein
the microprocessor of the first storage apparatus is configured to, when a fourth data stored in a volume of the first storage apparatus is stored in the second cache area and, when a free area of the second cache area becomes less than a preconfigured other cache threshold, determine based on the degree of importance whether the fourth data is to be kept in the virtual cache area, and when the fourth data is not to be kept in the virtual cache area, transmit a request for discarding the fourth data to the second storage apparatus, and discard information on the fourth data from the management information.

9. A storage system according to claim 8 further comprising a third storage apparatus, wherein a microprocessor of the third storage apparatus is configured to allocate part of a cache area to the virtual cache area, and the microprocessor of the first storage apparatus is configured to, when the fourth data is to be kept in the virtual cache area, acquire the fourth data from the second cache area, determine whether a free area of the first cache area is less than a preconfigured own cache threshold, when a free area of the first cache area exceeds a preconfigured own cache threshold, store the fourth data in the first cache area, and make an apparatus in charge of a cache of the fourth data to be the first storage apparatus in the management information, when a free area of the first cache area is less than a preconfigured own cache threshold, and when the third storage apparatus has a cache area in which the fourth data can be stored, transmit the fourth data to the third storage apparatus, and make an apparatus in charge of a cache of the fourth data to be the third storage apparatus in the management information.

10. A storage system according to claim 8, wherein the own cache threshold is configured at a value higher than the other cache threshold.

11. A cache area control method of a storage system coupled to a host computer and including a first and second storage apparatuses, the first and second storage apparatuses each including a shared area and cache areas, the method comprising:

causing the first storage apparatus to allocate part of the cache areas to a virtual cache area and the second storage apparatus to allocate part of the cache areas to the virtual cache area, causing the first and second storage apparatuses each to store in the shared area management information representing data existing in the virtual cache area and a free area size for each of the cache areas, the management information representing association among the data, an apparatus in charge of a cache which is a storage apparatus having cache areas to store the data, an apparatus in charge of a volume which is a storage apparatus having a volume to store the data, and a degree of importance representing responsiveness to an input/output (I/O) request from the host computer to the data, the method further comprising:

causing the first storage apparatus to, when a read request specifying a first data is received from the host computer, determine whether the first data exists in the virtual cache area based on the management information, and when the first data exists in the virtual cache area, determine whether the first data is stored in the first cache area of the first storage apparatus, when the first data is not stored in the first cache area, acquire the first data from a second cache area of the second storage apparatus based on the management information, store the first data in the first cache area, then transmit the first data to the host computer, based on the degree of importance, determine whether the first data is to be associated with the first cache area or to be associated with the second cache area, when a determination is made that association with the first cache area is implemented, notify the second storage apparatus to that effect, change an apparatus in charge of a cache of the first data from the second storage apparatus to the first storage apparatus in the management information, and when a determination is made that association with the second cache area is implemented, notify the second storage apparatus to that effect, and delete a first data stored in the first cache area.

\* \* \* \* \*